United States Patent
Nakahara et al.

(10) Patent No.: US 9,106,077 B2
(45) Date of Patent: Aug. 11, 2015

(54) POWER CONTROL APPARATUS AND POWER CONTROL METHOD

(75) Inventors: Masayuki Nakahara, Osaka (JP); Tatsuto Kinjo, Osaka (JP); Takahiro Kudoh, Kyoto (JP); Yoshikatsu Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 13/816,582

(22) PCT Filed: Mar. 14, 2012

(86) PCT No.: PCT/JP2012/001752
§ 371 (c)(1),
(2), (4) Date: Feb. 12, 2013

(87) PCT Pub. No.: WO2012/132282
PCT Pub. Date: Oct. 4, 2012

(65) Prior Publication Data
US 2013/0134946 A1    May 30, 2013

(30) Foreign Application Priority Data
Mar. 29, 2011   (JP) ................................ 2011-072863

(51) Int. Cl.
*H02J 7/00*    (2006.01)
*H01M 10/44*   (2006.01)
(Continued)

(52) U.S. Cl.
CPC ............... *H02J 7/00* (2013.01); *H01M 10/441* (2013.01); *H02J 1/14* (2013.01); *H02J 7/34* (2013.01); *H02J 7/35* (2013.01); *H01M 10/482* (2013.01); *H02J 2001/106* (2013.01)

(58) Field of Classification Search
CPC ..... H01M 10/441; H01M 10/482; H02J 1/14; H02J 2001/106; H02J 7/00; H02J 7/34; H02J 7/35
See application file for complete search history.

(56) References Cited

U.S. PATENT DOCUMENTS 5,784,626 A    7/1998  Odaohara
7,436,644 B2  10/2008  Nagai et al.
(Continued)

FOREIGN PATENT DOCUMENTS

CN    1667911      9/2005
EP    1 837 944    9/2007
(Continued)

OTHER PUBLICATIONS

International Search Report issued May 29, 2012 in International (PCT) Application No. PCT/JP2012/001752.
(Continued)

*Primary Examiner* — Nha Nguyen
(74) *Attorney, Agent, or Firm* — Wenderoth, Lind & Ponack, L.L.P.

(57) ABSTRACT

A power control apparatus includes: a control unit that controls discharged power of a first battery and discharged power of a second battery; and a power acquisition unit that acquires a total power to be supplied from the first and second batteries to a load device connected to the first and second batteries. The control unit: in a first period, changes the discharged power of the first battery according to a change in the acquired total power, and changes the discharged power of the second battery toward a first direction in which the discharged power of the second battery approximates the discharged power of the first battery; and, in a second period after the first period, changes the discharged power of the second battery according to the change in the acquired total power, and changes the discharged power of the first battery toward a second direction opposite the first direction.

12 Claims, 23 Drawing Sheets

(51) Int. Cl.
*H02J 1/14* (2006.01)
*H02J 7/34* (2006.01)
*H02J 7/35* (2006.01)
*H01M 10/48* (2006.01)
*H02J 1/10* (2006.01)

(56) References Cited

U.S. PATENT DOCUMENTS

| | | |
|---|---|---|
| 7,486,051 B2 | 2/2009 | Zhang |
| 2003/0047209 A1 | 3/2003 | Yanai et al. |
| 2005/0174711 A1 | 8/2005 | Nagai et al. |
| 2005/0180067 A1 | 8/2005 | Zhang |
| 2006/0058897 A1* | 3/2006 | Senda et al. .................. 700/22 |
| 2010/0087961 A1* | 4/2010 | Velez ........................... 700/292 |

FOREIGN PATENT DOCUMENTS

| | | |
|---|---|---|
| JP | 8-54967 | 2/1996 |
| JP | 2003-79054 | 3/2003 |
| JP | 2004-229391 | 8/2004 |
| JP | 2006-67644 | 3/2006 |
| JP | 2007-259612 | 10/2007 |
| JP | 2010-4611 | 1/2010 |

OTHER PUBLICATIONS

Chinese Office Action with Search Report issued Feb. 25, 2015 in corresponding Chinese Application No. 201280002063.X (with partial English translation).

* cited by examiner

POWER CONTROL APPARATUS AND POWER CONTROL METHOD

TECHNICAL FIELD

The present invention relates to a power control apparatus and power control method which control discharged power of plural storage batteries.

BACKGROUND ART

Recently, solar power generation systems which generate electric power using solar energy have spread even to ordinary houses. FIG. 21 is a conceptual diagram showing an ordinary house to which a solar power generation system is introduced.

In the ordinary house shown in FIG. 21, a load device 904, which is a household electrical appliance, is connected to an electric power system 903, a solar power generation apparatus 901, and a storage battery 902. The electric power system 903 here is a system for power supplied from an electric power company. Also, the solar power generation apparatus 901 is an apparatus which generates electric power using solar energy. Also, the storage battery 902 is an apparatus intended to accumulate the electric power generated by the solar power generation apparatus 901. The load device 904 is supplied with electric power from these power sources.

For example, when sufficient electric power is available from the solar power generation apparatus 901, the load device 904 is supplied with electric power from the solar power generation apparatus 901. When sufficient electric power is not available from the solar power generation apparatus 901, electric power is supplemented by the storage battery 902. Furthermore, when power supply from the solar power generation apparatus 901 and storage battery 902 is deficient, electric power is supplemented by the electric power system 903. Consequently, the load device 904 is supplied with electric power from at least one of the solar power generation apparatus 901, storage battery 902, and electric power system 903.

Examples of solar power generation systems such as described above include a solar power generation system described in Patent Literature 1.

CITATION LIST

Patent Literature

[PTL 1] Japanese Unexamined Patent Application Publication No. 2003-079054

SUMMARY OF INVENTION

Technical Problem

However, in order to supplement power consumption of household electrical appliances using a storage battery during periods when amounts of solar power generation are small, such as on cloudy days or during nighttime hours, a high-capacity storage battery is needed even in an ordinary house. When the electric power accumulated in the high-capacity battery is used, an amount of electric power purchased from an electric power system can be reduced. Thus, there are some cases where plural storage batteries are installed in combination to achieve a high-capacity storage battery.

FIG. 22 is a conceptual diagram of a solar power generation system which uses plural storage batteries. In FIG. 22, a first storage battery 911 and a second storage battery 912 are used instead of the storage battery 902 shown in FIG. 21. In the example shown in FIG. 22, the storage battery used to supply electric power to the load device 904 is selectively switched between the first storage battery 911 and second storage battery 912. Then, electric power is supplied to the load device 904 from one of the first storage battery 911 and second storage battery 912.

Consequently, the electric power consumed by the load device 904 is supplemented by electric power accumulated in plural storage batteries. In this case, the switching of the storage batteries needs to be done seamlessly whenever possible. In switching the storage batteries, when there is any period during which electric power is not supplied from either battery, electric power flows in from the electric power system 903.

FIG. 23 is a diagram showing a first example of switching from the first storage battery 911 to the second storage battery 912 in the solar power generation system shown in FIG. 22. The top part of FIG. 23 shows total power to be supplied to the load device 904 from the first storage battery 911 and second storage battery 912. That is, the total power here is electric power given by the electric power consumed by the load device 904 minus the delivered power of the solar power generation apparatus 901.

Also, the middle part of FIG. 23 shows discharged power of the first storage battery 911. In addition, the bottom part of FIG. 23 shows discharged power of the second storage battery 912.

In the example of FIG. 23, the second storage battery 912 starts discharging after the first storage battery 911 stops discharging. Then, during switching from the first storage battery 911 to the second storage battery 912, there is an outage period during which electric power is not supplied from either of the first storage battery 911 and second storage battery 912.

In this case, electric power flows in from the electric power system 903 during the outage period. Consequently, energy supplied from the electric power system 903 is consumed rather than energy supplied from the solar power generation apparatus 901.

It is also conceivable to supplement power supply during the outage period using a capacitor. However, a capacitor with very high capacitance and a high withstand voltage is required in order to supplement such bulk electric power as handled by a solar power generation system. In addition, a large space is required as well in order to install the capacitor. Thus, a method with a supplemental use of a capacitor is also not realistic.

FIG. 24 is a diagram showing a second example of switching from the first storage battery 911 to the second storage battery 912 in the solar power generation system shown in FIG. 22. The top part of FIG. 24 shows total power to be supplied to the load device 904 from the first storage battery 911 and second storage battery 912 as in the case of FIG. 23. Also, the middle part of FIG. 24 shows discharged power of the first storage battery 911. In addition, the bottom part of FIG. 24 shows discharged power of the second storage battery 912.

In the example of FIG. 24, the second storage battery 912 starts discharging before the first storage battery 911 stops discharging. Then, during switching from the first storage battery 911 to the second storage battery 912, there is an overlap period during which electric power is supplied from both the first storage battery 911 and second storage, battery 912. In the overlap period of FIG. 24, twice as much electric power as the required total power is discharged.

In this case, excess power flows out to the electric power system 903. This phenomenon is also known as reverse power flow. In Japan, in particular, it is not permitted to sell electric power accumulated in storage batteries, via reverse power flow. Therefore, excessive discharge from storage batteries is not desirable.

Thus, an object of the present invention is to provide a power control apparatus which can smoothly switch a storage battery to be discharged according to required power.

Solution to Problem

In order to solve the aforementioned problems, a power control apparatus according to the present invention includes: a control unit configured to control a discharged power of a first storage battery and a discharged power of a second storage battery; and a power acquisition unit configured to acquire a total power to be supplied from the first storage battery and the second storage battery to a load device connected to the first storage battery and the second storage battery, wherein the control unit is configured to: in a first period, change the discharged power of the first storage battery according to a change in the total power acquired by the power acquisition unit, and change the discharged power of the second storage battery toward a first direction which is a direction in which the discharged power of the second storage battery comes close to the discharged power of the first storage battery; and in a second period after the first period, change the discharged power of the second storage battery according to the change in the total power acquired by the power acquisition unit, and change the discharged power of the first storage battery toward a second direction which is a direction opposite the first direction.

It should be noted that the present invention may also be implemented as an integrated circuit including the components of the power control apparatus, a power control method for executing the processing by the power control apparatus, or a program that causes a computer to execute the power control method.

Advantageous Effects of Invention

The present invention makes it possible to smoothly switch the storage battery to be discharged, according to required power. This enables effective use of the electric power accumulated in the storage batteries.

DESCRIPTION OF EMBODIMENTS

Figure 1:
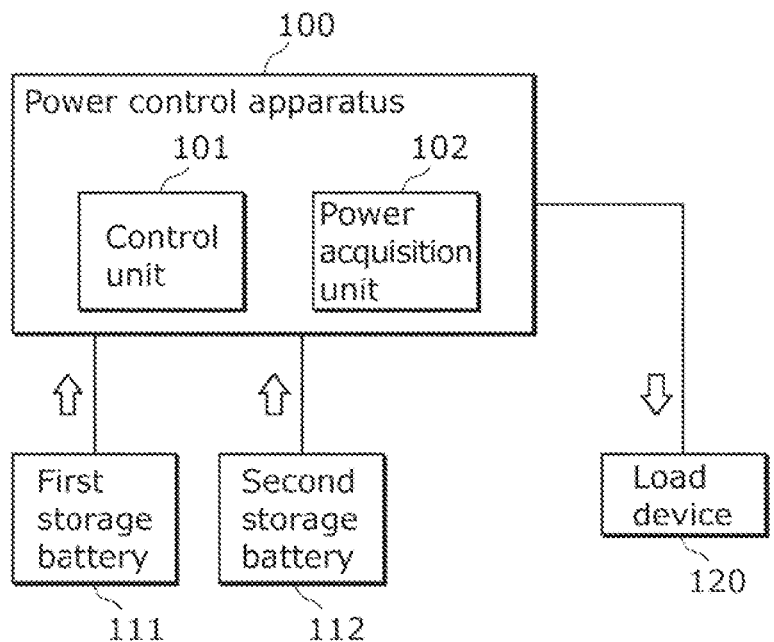
FIG. 1 is a block diagram showing a power control apparatus according to Embodiment 1.

A power control apparatus according to an aspect of the present invention includes: a control unit configured to control a discharged power of a first storage battery and a discharged power of a second storage battery; and a power acquisition unit configured to acquire a total power to be supplied from the first storage battery and the second storage battery to a load device connected to the first storage battery and the second storage battery, wherein the control unit is configured to in a first period, change the discharged power of the first storage battery according to a change in the total power acquired by the power acquisition unit, and change the discharged power of the second storage battery toward a first direction which is a direction in which the discharged power of the second storage battery comes close to the discharged power of the first storage battery; and in a second period after the first period, change the discharged power of the second storage battery according to the change in the total power acquired by the power acquisition unit, and change the discharged power of the first storage battery toward a second direction which is a direction opposite the first direction.

Accordingly, in switching from the first storage battery to the second storage battery, the discharged power of the first storage battery and the discharged power of the second storage battery can be made to come close to each other. Therefore, the storage battery to be discharged can be switched smoothly, from the first storage battery to the second storage battery, depending on the required power. Therefore, the power stored in the storage batteries can be used effectively.

Furthermore, the control unit may be configured to: in the first period, change the discharged power of the second storage battery toward the first direction by increasing the discharged power of the second storage battery from 0; and in the second period, change the discharged power of the first storage battery toward the second direction by decreasing the discharged power of the first storage battery to 0.

Accordingly, the power control apparatus can set the discharged power of the second storage battery to 0 before the start of the switching process. Furthermore, the power control apparatus can set the discharged power of the first storage battery to 0 after the completion of the switching process. Therefore, the power control apparatus can stop the first storage battery or the second storage battery.

Furthermore, the control unit may be configured to: in the first period, change the discharged power of the second storage battery toward the first direction by increasing the discharged power of the second storage battery at a first rate; and in the second period, change the discharged power of the first storage battery toward the second direction by decreasing the discharged power of the first storage battery at a second rate.

Accordingly, in the switching process, an abrupt change in power supply can be suppressed. Therefore, power is supplied stably even during the switching process.

Furthermore, the control unit may be configured to stop changing the discharged power of the first storage battery according to the change in the total power, in a third period between the first period and the second period.

Accordingly, the power control apparatus can appropriately switch the control of discharged power.

Furthermore, the control unit may be configured to, in the third period, stop changing the discharged power of the first storage battery according to the change in the total power, and change the discharged power of the first storage battery toward the second direction.

Accordingly, the discharged power of the first storage battery comes close to the discharged power of the second storage battery prior to the start of the switching process. Therefore, the storage battery to be discharged can be switched smoothly depending on the required power.

Furthermore, the control unit may be configured to, in the third period, change the discharged power of the second storage battery toward the first direction.

Accordingly, the power control apparatus can continue to perform the same control on the second storage battery in the first period and the third period. Therefore, the control is simplified.

Furthermore, the control unit may be configured to stop changing the discharged power of the first storage battery according to the change in the total power, after an elapse of a predetermined period from a start of the third period.

Accordingly, the timing at which the following stops in the first storage battery and the timing at which the following starts in the second storage battery become closer. Therefore, the switching process is executed more seamlessly.

Furthermore, the control unit may be configured to control the discharged power of the first storage battery and the discharged power of the second storage battery and thereby keep a sum of the discharged power of the first storage battery and the discharged power of the second storage battery constant from when the control unit stops changing the discharged power of the first storage battery according to the change in the total power to when the second period starts.

Accordingly, power is supplied stably even while discharging that follows the change in required power is not executed.

Furthermore, the control unit may be configured to: in the first period, change the discharged power of the second storage battery toward the first direction and change the discharged power of the first storage battery according to the change in the total power and thereby keep a sum of the discharged power of the first storage battery and the discharged power of the second storage battery equal to the total power acquired by the power acquisition unit; and in the second period, change the discharged power of the first storage battery toward the second direction and change the discharged power of the second storage battery according to the change in the total power and thereby keep a sum of the discharged power of the first storage battery and the discharged power of the second storage battery equal to the total power acquired by the power acquisition unit.

Accordingly, the discharged power of the first storage battery and the second storage battery are appropriately controlled by following the change in required power.

Furthermore, the power acquisition unit may be configured to acquire the total power from the discharged power of the first storage battery, the discharged power of the second storage battery, and an excess or deficiency of power supply to the load device in relation to electric power consumed by the load device.

Accordingly, the total power to be supplied to the load device from the first storage battery and the second storage battery is properly acquired.

A power control method according to an aspect of the present invention may be a power control method including: controlling a discharged power of a first storage battery and a discharged power of a second storage battery; and acquiring a total power to be supplied from the first storage battery and the second storage battery to a load device connected to the first storage battery and the second storage battery, wherein in the controlling: in a first period, the discharged power of the first storage battery is changed according to a change in the total power acquired in the acquiring, and the discharged power of the second storage battery is changed toward a first direction which is a direction in which the discharged power of the second storage battery comes close to the discharged power of the first storage battery; and in a second period after the first period, the discharged power of the second storage battery is changed according to the change in the total power acquired in the acquiring, and the discharged power of the first storage battery is changed toward a second direction which is a direction opposite the first direction.

Accordingly, the power control apparatus is implemented as a power control method.

A program according to an aspect of the present invention may be a program for causing a computer to execute the power control method.

Accordingly, the power control method is implemented as a program.

An integrated circuit according to an aspect of the present invention may be an integrated circuit including: a control unit configured to control a discharged power of a first storage battery and a discharged power of a second storage battery; and a power acquisition unit configured to acquire a total power to be supplied from the first storage battery and the second storage battery to a load device connected to the first storage battery and the second storage battery, wherein the control unit is configured to: in a first period, change the discharged power of the first storage battery according to a change in the total power acquired by the power acquisition unit, and change the discharged power of the second storage battery toward a first direction which is a direction in which the discharged power of the second storage battery comes close to the discharged power of the first storage battery; and in a second period after the first period, change the discharged power of the second storage battery according to the change in the total power acquired by the power acquisition unit, and change the discharged power of the first storage battery toward a second direction which is a direction opposite the first direction.

Accordingly, the power control apparatus is implemented as an integrated circuit.

Hereinafter, exemplary embodiments of the present invention shall be described in detail using the Drawings. It should be noted that each of the embodiments described hereafter illustrates a preferred specific example of the present invention. The numerical values, shapes, components, the arrangement and connection of the components, steps, the processing order of the steps etc. shown in the following exemplary embodiments are mere examples, and are not intended to limit the present invention. Furthermore, among the components in the following embodiments, components not recited in any one of the independent claims defining the most generic concept of the present invention are described as arbitrary components making up a more preferable form.

Embodiment 1

FIG. 1 is a block diagram showing a power control apparatus according to Embodiment 1. The power control apparatus 100 shown in FIG. 1 includes a control unit 101 and a power acquisition unit 102. Also, the power control apparatus 100 is connected to a first storage battery 111, a second storage battery 112, and a load device 120.

The load device 120 is typically a household electrical appliance which consumes supplied electric power. The load device 120 may be another device which consumes supplied electric power.

The first storage battery 111 is a chargeable and dischargeable battery. The first storage battery 111 is charged or discharged under the control of the power control apparatus 100. The first storage battery 111 typically accumulates electric power generated by a solar power generation apparatus, but may accumulate electric power obtained from other than the solar power generation apparatus. For example, the first storage battery 111 may accumulate electric power obtained from a fuel cell or electric power obtained from an electric power company via an electric power system. The second storage battery 112 is an apparatus similar to the first storage battery 111.

The power acquisition unit 102 is a processing unit which acquires total power to be supplied from the first storage battery 111 and second storage battery 112 to the load device 120. The total power here is the total of electric power to be desirably supplied from the first storage battery 111 and second storage battery 112 to the load device 120 and does not include electric power supplied from the solar power generation apparatus and the like. For example, the electric power consumed by the load device 120 excluding the electric power supplied from the solar power generation apparatus is the total power. The total power may be, in other words, referred to as a required power.

Also, the power acquisition unit 102 may acquire excess or deficiency of power supply to the load device 120. Then, the power acquisition unit 102 can acquire the total power to be supplied, based on the excess or deficiency of power supply.

The control unit 101 is a processing unit which controls the discharged power of the first storage battery 111 and discharged power of the second storage battery 112. Furthermore, the control unit 101 may control charging power of the first storage battery 111 and charging power of the second storage battery 112.

For example, when a charge level of the first storage battery 111 is 10% or less, the control unit 101 causes the second storage battery 112 to discharge. Alternatively, in this case, the control unit 101 causes the first storage battery 111 to be charged. Also, when the charge level of the first storage battery 111 is 90% or above, the control unit 101 causes the first storage battery 111 to discharge. Alternatively, in this case, the control unit 101 causes the second storage battery 112 to be charged.

Here, the control unit 101 changes the discharged power of one of the first storage battery 111 and second storage battery 112 by following changes in the total power. That is, the control unit 101 adjusts the discharged power, following the changes in the total power. This allows necessary electric power to be supplied to the load device 120.

Note that in FIG. 1, the load device 120 is connected to the first storage battery 111 and second storage battery 112 via the power control apparatus 100. However, the connection topology of the power control apparatus 100, first storage battery 111, second storage battery 112, and load device 120 is not limited to the topology shown in FIG. 1. For example, the load device 120 may be connected directly to the first storage battery 111 and second storage battery 112.

Figure 2:
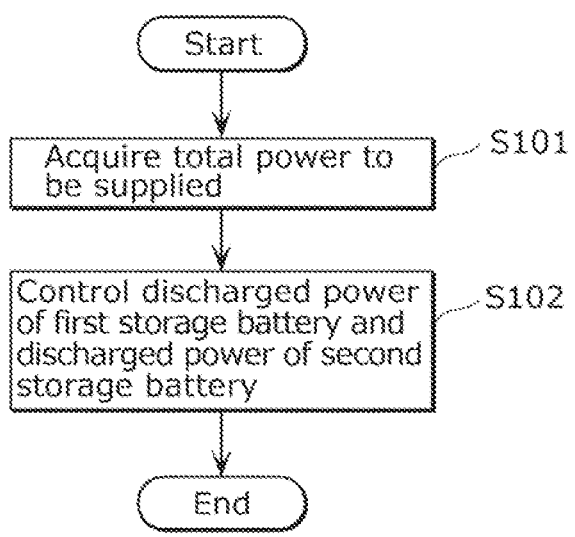
FIG. 2 is a flowchart showing a power control process according to Embodiment 1.

FIG. 2 is a flowchart showing a power control process of the power control apparatus 100 shown in FIG. 1. First, the power acquisition unit 102 acquires the total power to be supplied from the first storage battery 111 and second storage battery 112 to the load device 120 (S101). Next, the control unit 101 controls the discharged power of the first storage battery 111 and discharged power of the second storage battery 112 (S102).

The power control apparatus 100 repeats the process shown in FIG. 2 and thereby supplies electric power from the first storage battery 111 and second storage battery 112 to the load device 120 according to the total power. Also, for example, based on the charge levels, the power control apparatus 100 switches the storage battery whose discharged power is to be changed by following changes in the total power.

Figure 3:
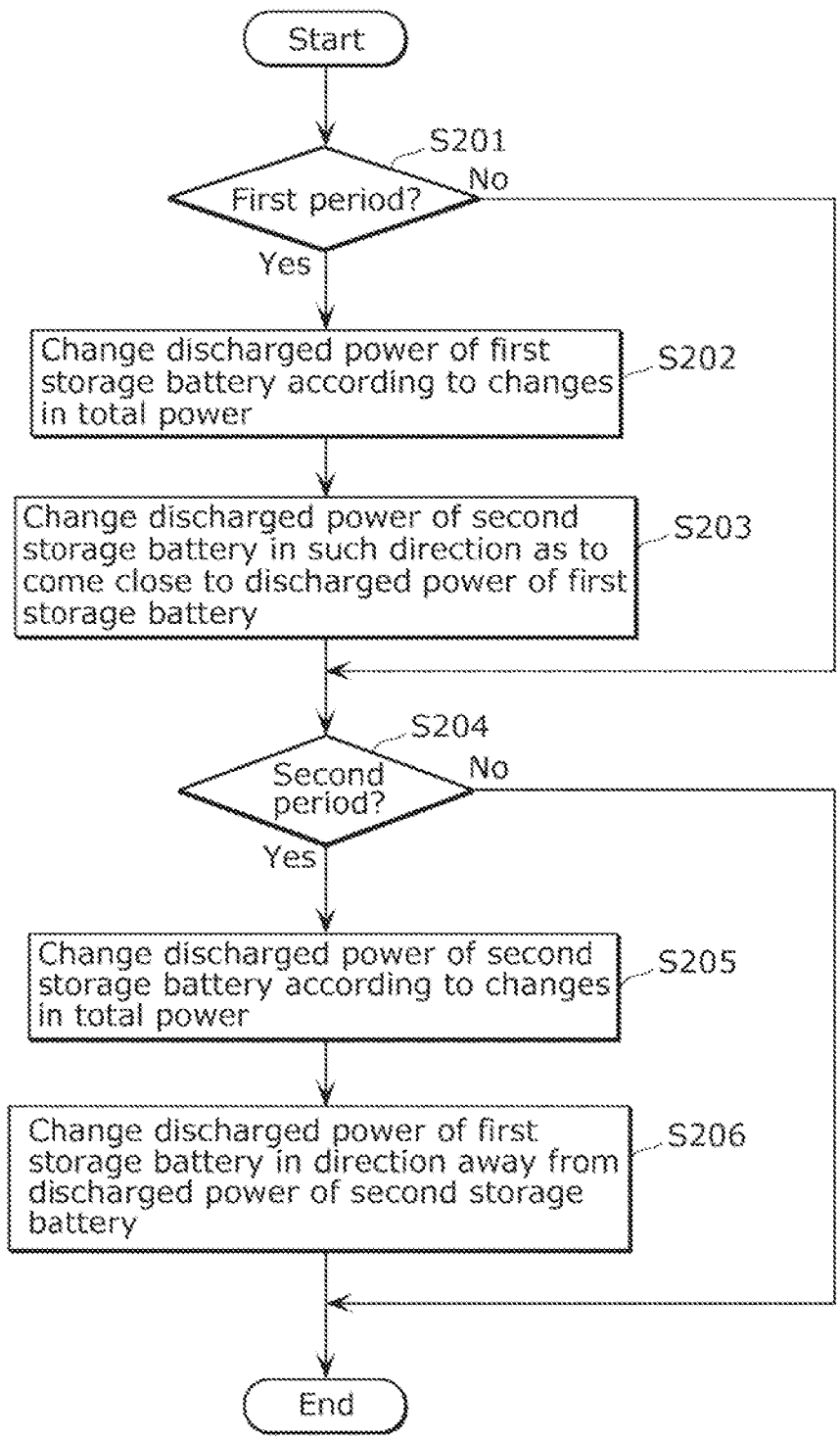
FIG. 3 is a flowchart showing details of the power control process according to Embodiment 1.

FIG. 3 is a flowchart showing details of the power control process (S102) shown in FIG. 2, showing, in particular, the process of switching between the storage batteries.

When the current time belongs to a first period (Yes in S201), the control unit 101 changes the discharged power of the first storage battery 111 according to changes in the total power acquired by the power acquisition unit 102 (S202). Also, the control unit 101 changes the discharged power of the second storage battery 112 in a first direction to bring the discharged power of the second storage battery 112 close to the discharged power of the first storage battery 111 (S203).

In so doing, for example, the control unit 101 causes the first storage battery 111 to output electric power equal to the total power minus the discharged power of the second storage battery 112 and thereby changes the discharged power of the first storage battery 111 by following the changes in the total power. That is, while changing the discharged power of the second storage battery 112 in the first direction, the control unit 101 changes the discharged power of the first storage battery 111 such that the sum of the discharged power of the first storage battery 111 and discharged power of the second storage battery 112 will be equal to the total power.

When the current time belongs to a second period which is later than the first period (Yes in S204), the control unit 101 changes the discharged power of the second storage battery 112 according to changes in the total power acquired by the power acquisition unit 102 (S205). Also the control unit 101 changes the discharged power of the first storage battery 111 in a second direction opposite the first direction (S206). The second direction is a direction away from the discharged power of the second storage battery 112.

In so doing, for example, the control unit 101 causes the second storage battery 112 to output electric power equal to the total power minus the discharged power of the first storage battery 111 and thereby changes the discharged power of the second storage battery 112 by following the changes in the total power. That is, while changing the discharged power of the first storage battery 111 in the second direction, the control unit 101 changes the discharged power of the second storage battery 112 such that the sum of the discharged power of the first storage battery 111 and discharged power of the second storage battery 112 will be equal to the total power.

Note that the process (S202) of changing the discharged power of the first storage battery 111 and the process (S203) of changing the discharged power of the second storage battery 112 may be reversed in order in the first period. Also, the process (S205) of changing the discharged power of the second storage battery 112 and the process (S206) of changing the discharged power of the first storage battery 111 may be reversed in order in the second period.

Figure 4:
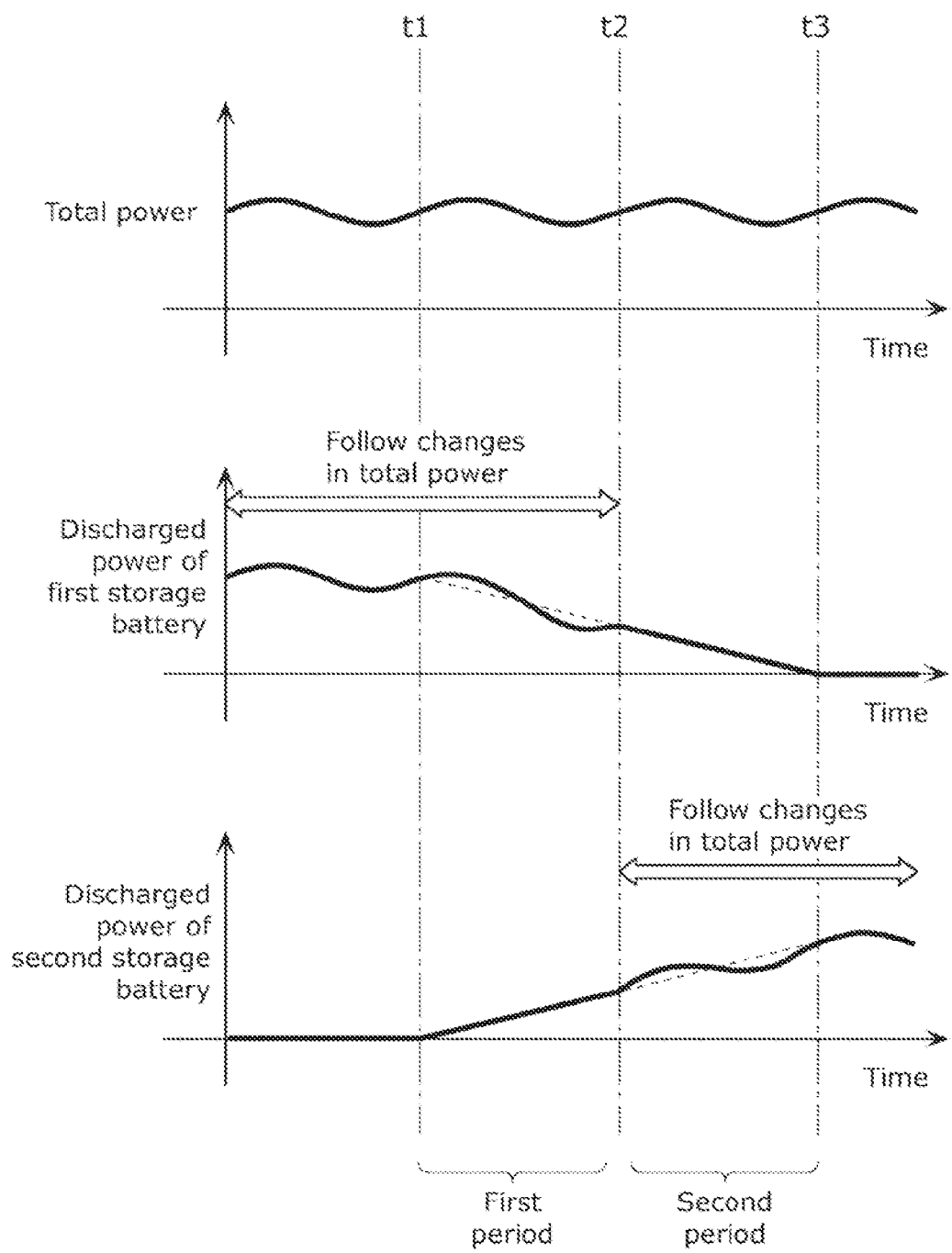
FIG. 4 is a diagram showing a first example of power control according to Embodiment 1.

FIG. 4 is a diagram showing a first example of power control by the power control apparatus 100 shown in FIG. 1. FIG. 4 shows a typical example of a switching process according to Embodiment 1.

First, the control unit 101 controls the discharged power of the second storage battery 112 so as to be 0 until time t1. That is, the control unit 101 keeps the second storage battery 112 from discharging. Also, the control unit 101 changes the discharged power of the first storage battery 111 according to changes in the total power acquired by the power acquisition unit 102. Until time t1, the discharged power of the first storage battery 111 is equal to the total power.

Next, from time t1 to time t2 (first period), the control unit 101 changes the discharged power of the second storage battery 112 in the first direction. In the example of FIG. 4, the control unit 101 increases the discharged power of the second storage battery 112 from 0 at a predetermined rate. Preferably, the predetermined rate here is such that no abrupt change occurs in electric power. Then, the control unit 101 increases the discharged power of the second storage battery 112 only to the extent that the discharged power of the second storage battery 112 does not exceed the total power.

Also, from time t1 to time t2, as in the case of the period until t1, the control unit 101 changes the discharged power of the first storage battery 111 according to changes in the total power acquired by the power acquisition unit 102. More specifically, the control unit 101 causes the first storage battery 111 to output electric power equal to the total power minus the discharged power of the second storage battery 112. Therefore, from time t1 to time t2, the discharged power of the first storage battery 111 tends to decrease with increases in the discharged power of the second storage battery 112.

Next, from time t2 to time t3 (second period), the control unit 101 changes the discharged power of the first storage battery 111 in the second direction. In the example of FIG. 4, the control unit 101 decreases the discharged power of the first storage battery 111 to 0 at a predetermined rate. The discharged power of the second storage battery 112 from time t1 to time t2 and the discharged power of the first storage battery 111 from time t2 to time t3 differ in the direction of change, but coincide in the rate of change.

Also, from time t2 to time t3, the control unit 101 changes the discharged power of the second storage battery 112 according to changes in the total power acquired by the power acquisition unit 102. More specifically, the control unit 101 causes the second storage battery 112 to output electric power equal to the total power minus the discharged power of the first storage battery 111. Therefore, from time t2 to time t3, the discharged power of the second storage battery 112 tends to increase with decreases in the discharged power of the first storage battery 111.

Then, from time t3, the control unit 101 controls the discharged power of the first storage battery 111 so as to be 0. That is, the control unit 101 keeps the first storage battery 111 from discharging. Also, as in the case of the period from time t2 to time t3, the control unit 101 changes the discharged power of the second storage battery 112 according to changes in the total power acquired by the power acquisition unit 102. From time t3, the discharged power of the second storage battery 112 is equal to the total power.

As shown in the example of FIG. 4, at around time t2, the discharged power of the first storage battery 111 and discharged power of the second storage battery 112 become almost equal.

In so doing, variation width of the discharged power of the first storage battery 111 which follows changes in the total power at around time t2 and variation width of the discharged power of the second storage battery 112 which follows changes in the total power at around time t2 become equal. Consequently, between time t1 and time t3, the variation widths of the discharged powers of the storage batteries which follow changes in the total power can be prevented from decreasing. As the variation widths are secured, the switching process can be performed smoothly.

For example, when the discharged power of the storage battery which follows changes in the total power is 0 or around a limit value such as a maximum dischargeable value, an allowable range of variation in discharged power becomes smaller. In such a case, it becomes difficult to follow the changes in the total power. In the power control process according to Embodiment 1, such a situation is avoided.

Also, timing to finish changing the discharged power of the first storage battery 111 by following changes in the total power does not always have to coincide with timing to start changing the discharged power of the second storage battery 112 by following changes in the total power.

Figure 23:
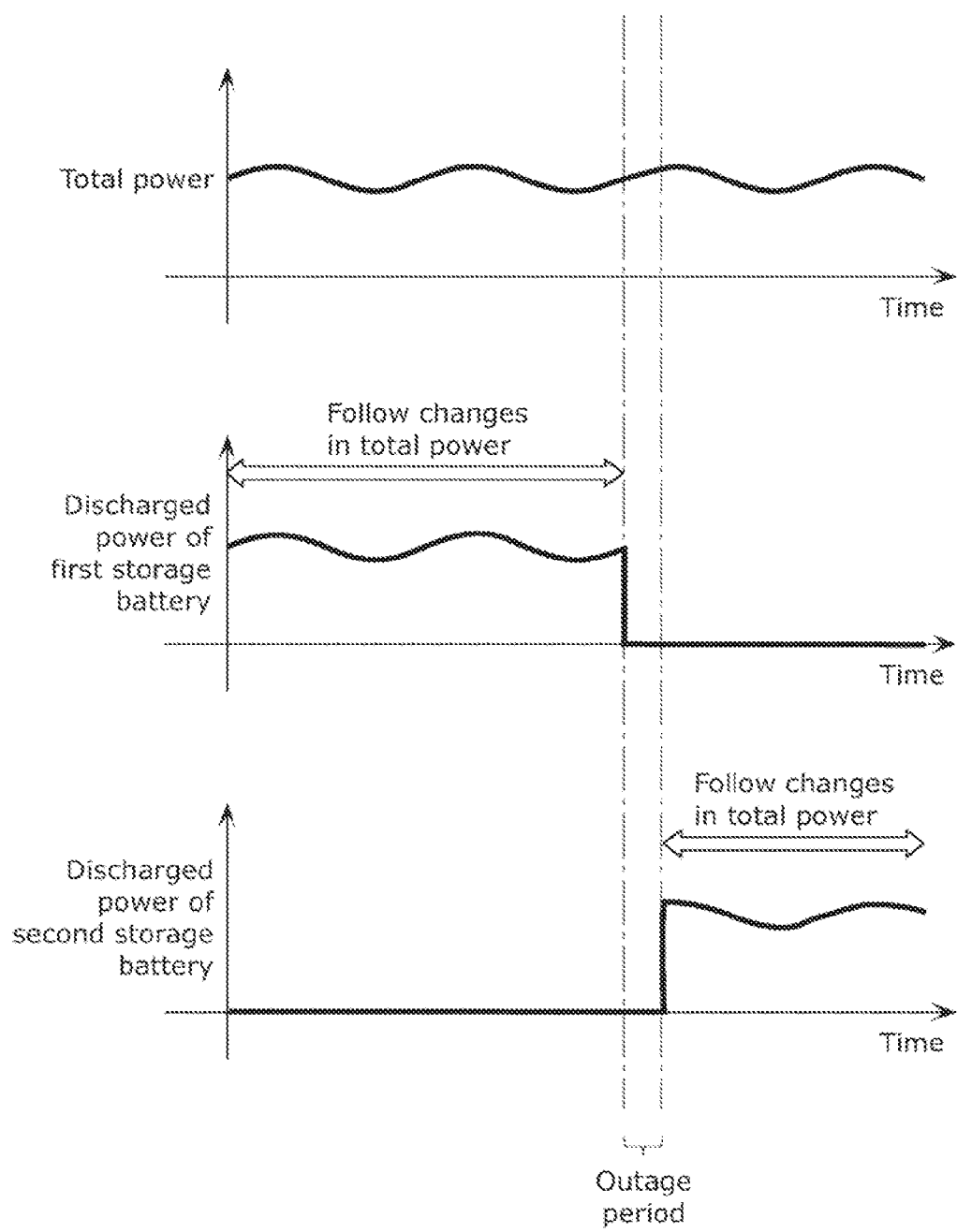
FIG. 23 is a diagram showing power control having an outage period.
Figure 24:
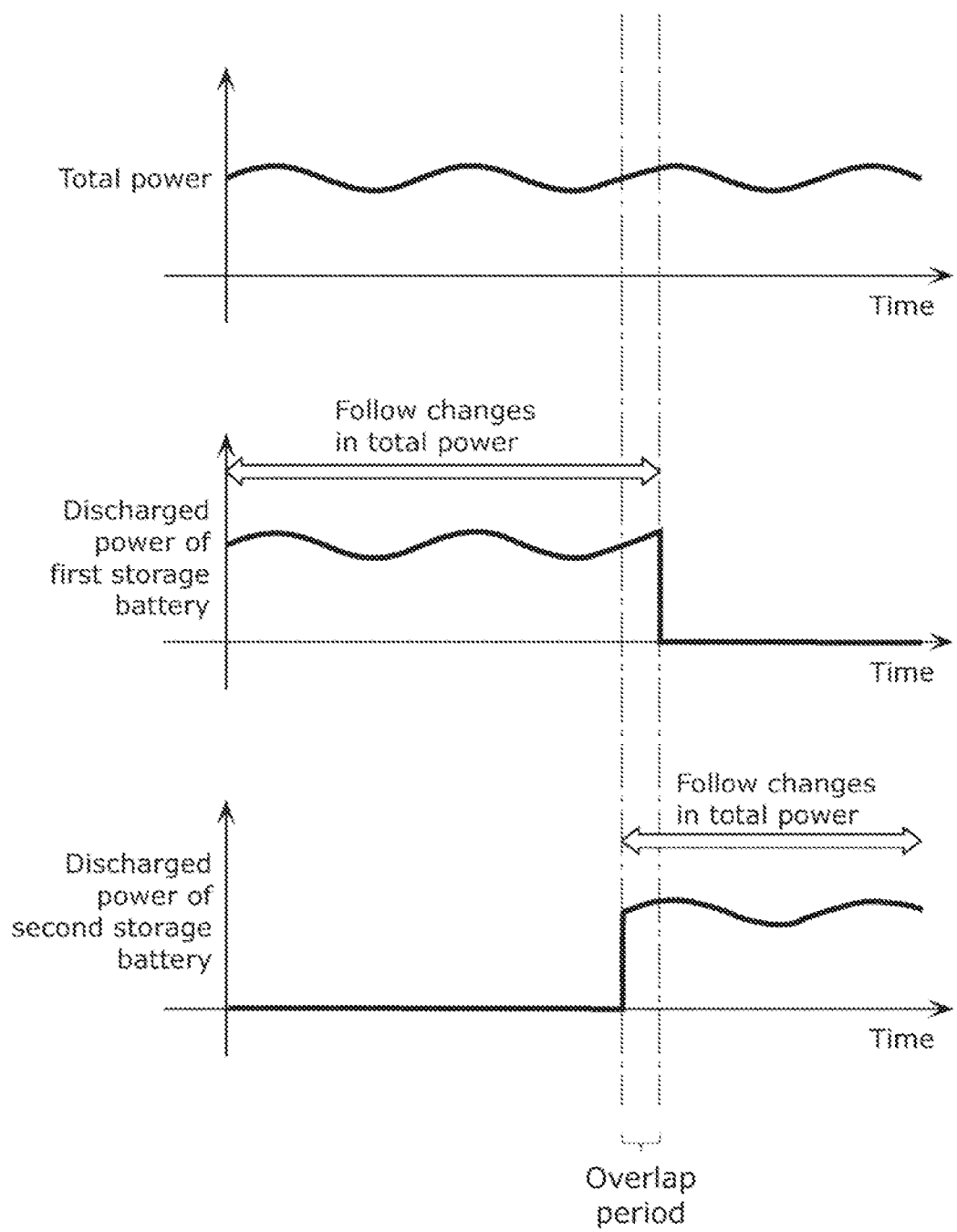
FIG. 24 is a diagram showing power control having an overlap period.

Even when the timings deviate from each other, the sum of the discharged power of the first storage battery 111 and discharged power of the second storage battery 112 does not vary greatly. In addition, the sum of the discharged powers of the two storage batteries does not become 0 unlike during the outage period shown in FIG. 23. Also, the sum of the discharged powers of the two storage batteries does not become approximately twice the total power unlike during the overlap period shown in FIG. 24.

In this case, the difference between the sum of the discharged powers of the two storage batteries and the total power is equivalent to the change in the total power caused by the timing deviation. Therefore, even in this case, there is less risk of excessive electric power being supplied from the storage batteries, causing a reverse power flow.

Note that the period from the time the second storage battery 112 starts increasing at a predetermined rate until the second storage battery 112 starts changing by following the changes in the total power, that is, the period from time t1 to time t2, may be a period determined in advance or a period determined based on the total power.

FIG. 4 shows an example of typical power control related to the switching process. However, the power control related to the switching process is not limited to the example of FIG. 4, and various modifications are conceivable.

Figure 5:
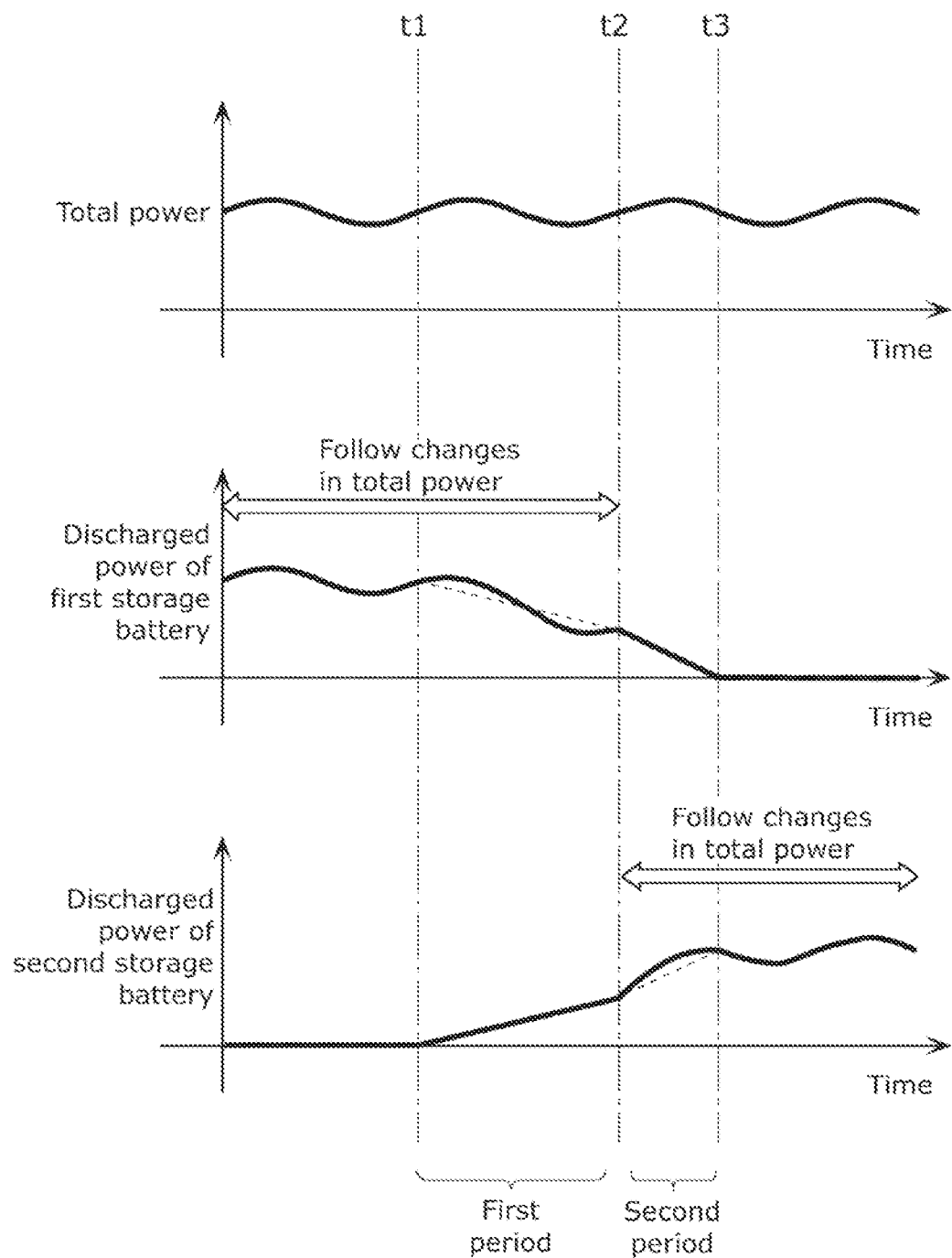
FIG. 5 is a diagram showing a second example of power control according to Embodiment 1.

FIG. 5 is a diagram showing a second example of power control by the power control apparatus 100 shown in FIG. 1. Compared to the example of FIG. 4, in the example of FIG. 5, the discharged power of the second storage battery 112 from time t1 to time t2 and the discharged power of the first storage battery 111 from time t2 to time t3 differ in the rate of change. Even when the rates of change differ in this way, similar effects can be obtained.

Also, from time t1 to time t2, the control unit 101 increases the discharged power of the second storage battery 112 at a relatively low rate such that the sum of the discharged power of the first storage battery 111 and discharged power of the second storage battery 112 does not exceed the total power to be supplied. Then, from time t2 to time t3, the control unit 101 decreases the discharged power of the first storage battery 111 at a relatively high rate in order to complete the switching process faster. Consequently, a smooth and fast switching process is implemented.

Figure 6:
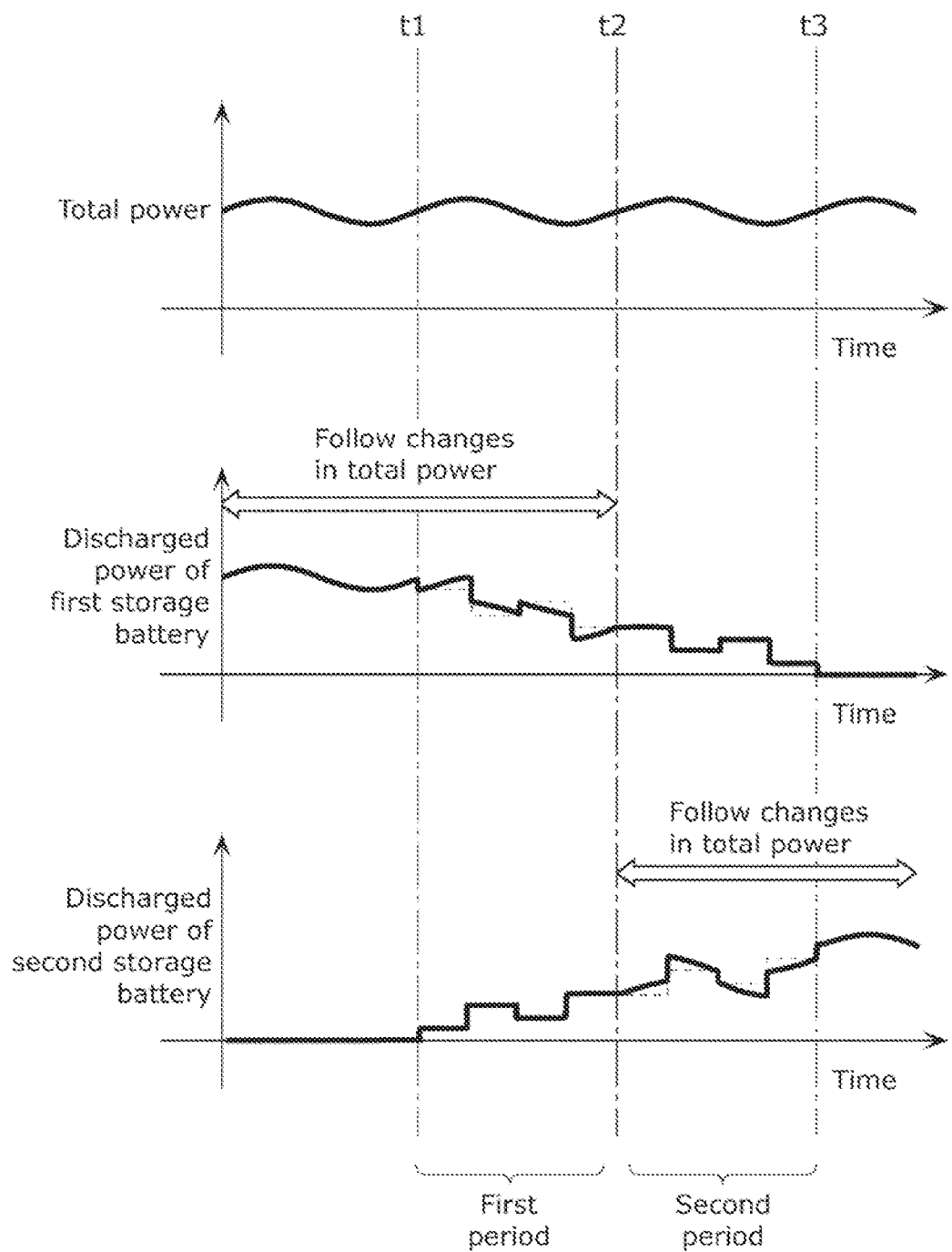
FIG. 6 is a diagram showing a third example of power control according to Embodiment 1.

FIG. 6 is a diagram showing a third example of power control by the power control apparatus 100 shown in FIG. 1. As shown in the example of FIG. 6, from time t1 to time t2, the discharged power of the second storage battery 112 may be increased stepwise or decreased temporarily. Also, from time t2 to time t3, the discharged power of the first storage battery 111 may be decreased stepwise or increased temporarily.

Similar effects can be obtained as long as the discharged power of the second storage battery 112 is on the increase between time t1 and time t2 and the first storage battery 111 is on the decrease between time t2 and time t3.

Figure 7:
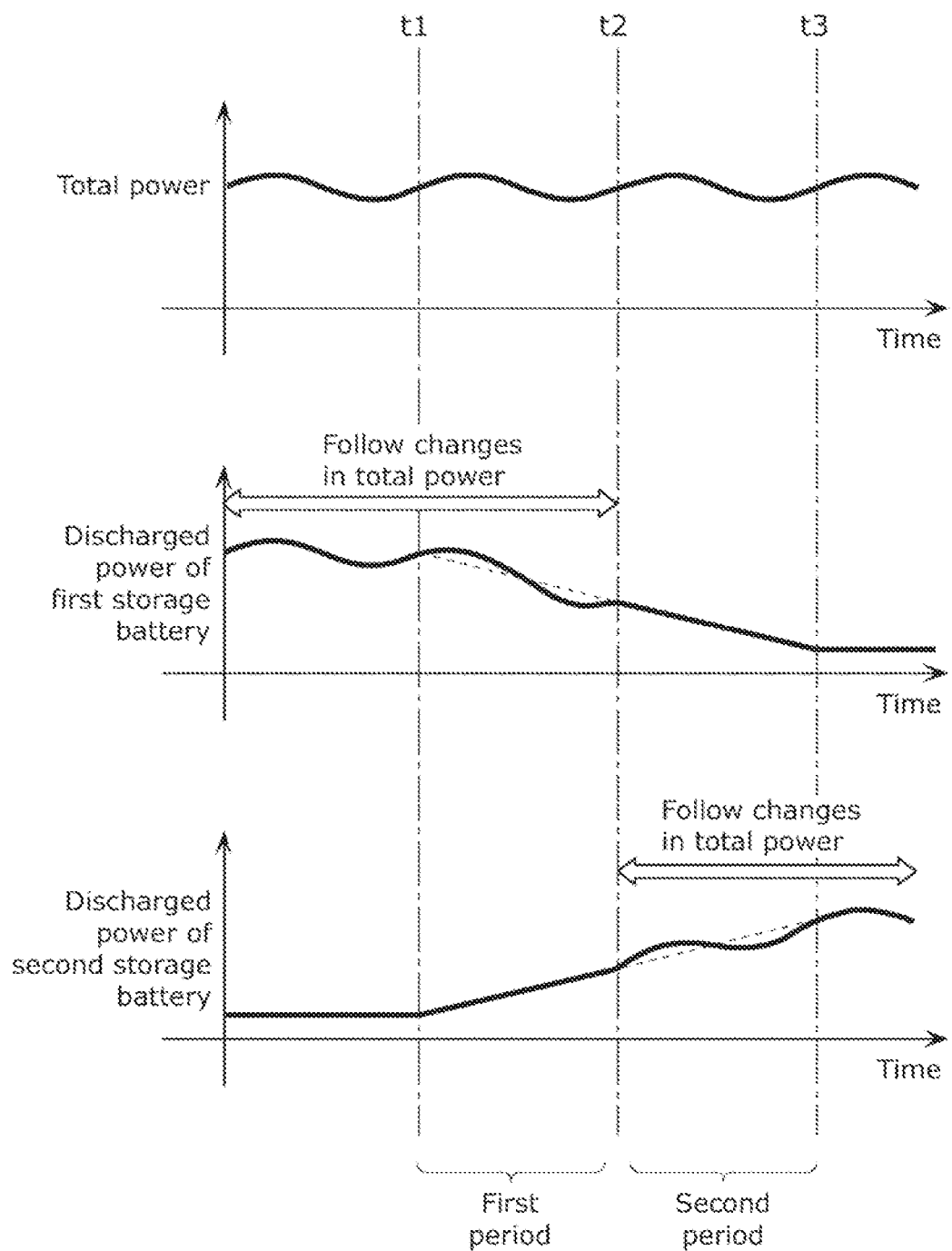
FIG. 7 is a diagram showing a fourth example of power control according to Embodiment 1.

FIG. 7 is a diagram showing a fourth example of power control by the power control apparatus 100 shown in FIG. 1. In the example of FIG. 7, the discharged power of the second storage battery 112 is not 0 and predetermined power is output until time t1. Then, from time t1 to time t2, the control unit 101 increases the discharged power of the second storage battery 112 from the predetermined power at a predetermined rate.

Also, from time t2 to time t3, the control unit 101 decreases the discharged power of the first storage battery 111 to predetermined power at a predetermined rate. Then, from time t3, the discharged power of the first storage battery 111 is not 0, and the predetermined power is output. The discharged power of the second storage battery 112 up to time t1 and the discharged power of the first storage battery 111 from time t3 are typically the same.

In this way, even when power is constantly output from both the first storage battery 111 and second storage battery 112, a similar switching process is applicable, and similar effects can also be obtained even in such a case.

Figure 8:
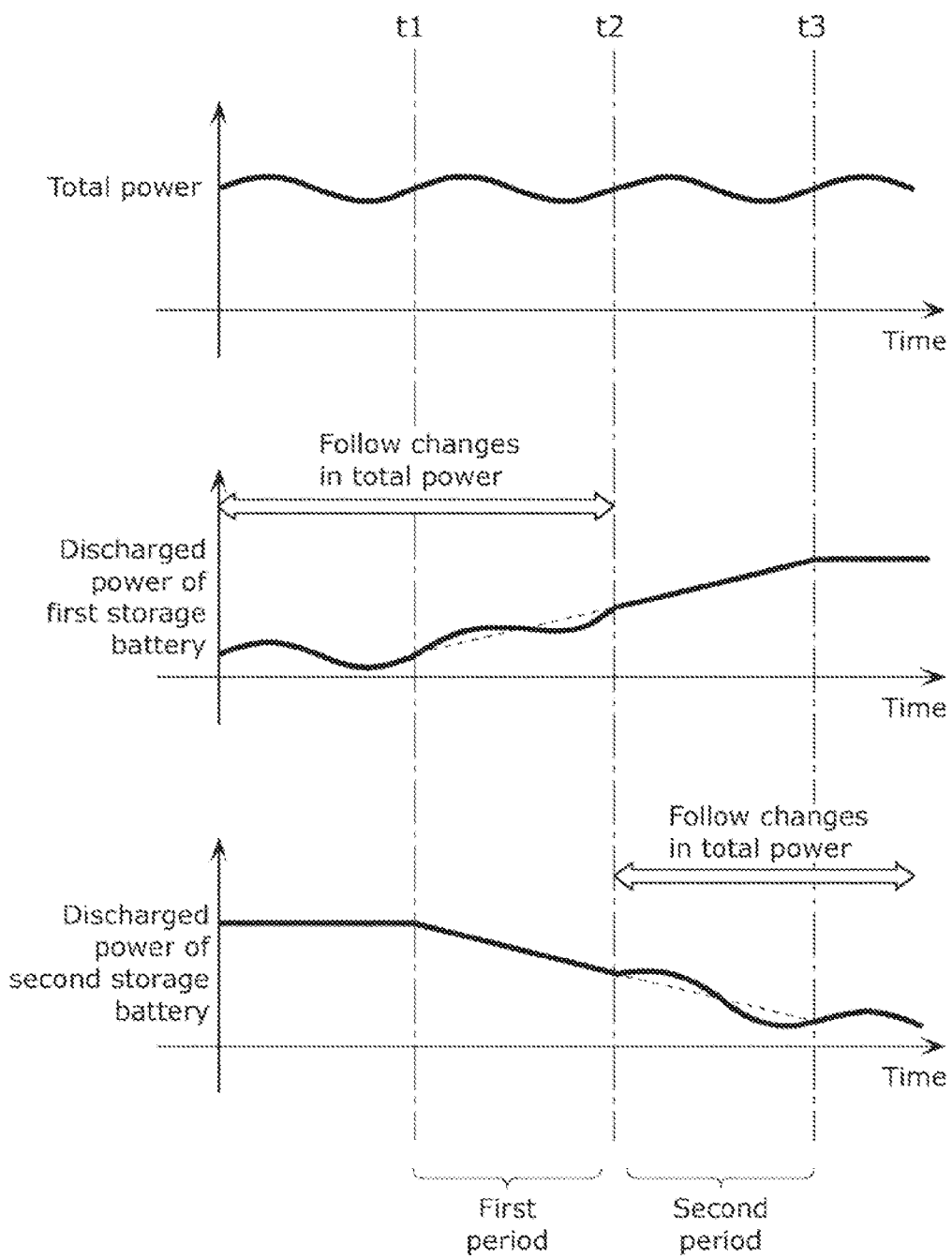
FIG. 8 is a diagram showing a fifth example of power control according to Embodiment 1.

FIG. 8 is a diagram showing a fifth example of power control by the power control apparatus 100 shown in FIG. 1. In the example of FIG. 8, as with the example of FIG. 7, the discharged power of the second storage battery 112 is not 0 and predetermined power is output until time t1. Furthermore, at this time, the discharged power of the second storage battery 112 is higher than the discharged power of the first storage battery 111.

In such a case, from time t1 to time t2, the control unit 101 decreases the discharged power of the second storage battery 112 from the predetermined power at a predetermined rate.

Also, from time t2 to time t3, the control unit 101 increases the discharged power of the first storage battery 111 to predetermined power at a predetermined rate. Then, from time t3, the discharged power of the first storage battery 111 is not 0, and the predetermined power is output. The discharged power of the second storage battery 112 up to time t1 and the discharged power of the first storage battery 111 from time t3 are typically the same.

In this way, even when the discharged power of the storage battery which follows changes in the total power is lower than the discharged power of the other storage battery, a similar switching process is applicable, and similar effects can also be obtained even in such a case.

Figure 9:
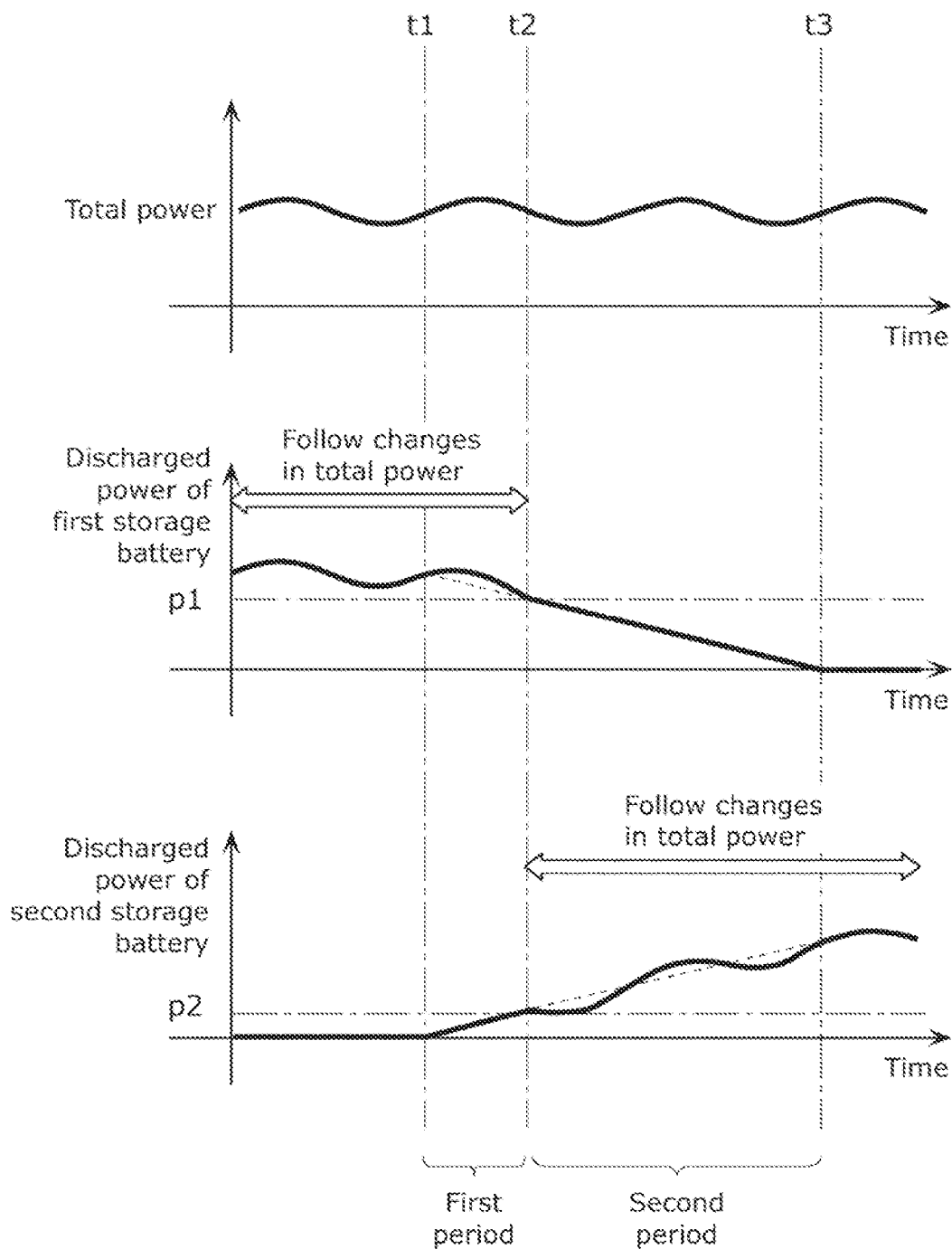
FIG. 9 is a diagram showing a sixth example of power control according to Embodiment 1.

FIG. 9 is a diagram showing a sixth example of power control by the power control apparatus 100 shown in FIG. 1. In the example of FIG. 9, when the discharged power of the first storage battery 111 and discharged power of the second storage battery 112 become approximately equal, the storage battery which is to follow changes in the total power is switched.

More specifically, first the control unit 101 changes the discharged power of the first storage battery 111 according to changes in the total power acquired by the power acquisition unit 102. At the same time, the control unit 101 increases the discharged power of the second storage battery 112. Then, the control unit 101 compares the discharged power of the first storage battery 111 and discharged power of the second storage battery 112. Then, when the discharged power of the first storage battery 111 and discharged power of the second storage battery 112 become approximately equal, the control unit 101 switches the storage battery which is to follow changes in the total power.

For example, in FIG. 9, when the absolute value of a difference between discharged power p1 of the first storage battery 111 and discharged power p2 of the second storage battery 112 falls to or below a predetermined threshold, the control unit 101 switches the storage battery which is to follow changes in the total power from the first storage battery 111 to the second storage battery 112. Consequently, the storage battery which is to follow changes in the total power can be switched with more appropriate timing.

In this way, when switching the storage battery to be discharged according to required power, from the first storage battery 111 to the second storage battery 112, the power control apparatus 100 according to Embodiment 1 brings the discharged power of the second storage battery 112 close to the discharged power of the first storage battery 111. Consequently, the power control apparatus 100 can avoid significant changes in electric power during switching. Also, this reduces the risk of supplying electric power more than necessary. Thus, the power control apparatus 100 can smoothly switch the storage battery to be discharged according to required power.

Note that in the process of switching from the first storage battery 111 to the second storage battery 112, preferably the control unit 101 brings the discharged power of the second storage battery 112 close to the discharged power of the first storage battery 111 gradually. After that, preferably the control unit 101 brings the discharged power of the first storage battery 111 away from the discharged power of the second storage battery 112 gradually. Consequently, the power control apparatus 100 can change the discharged power more reliably by following changes in the total power to be supplied, without causing significant changes in electric power.

Embodiment 2

Figure 10:
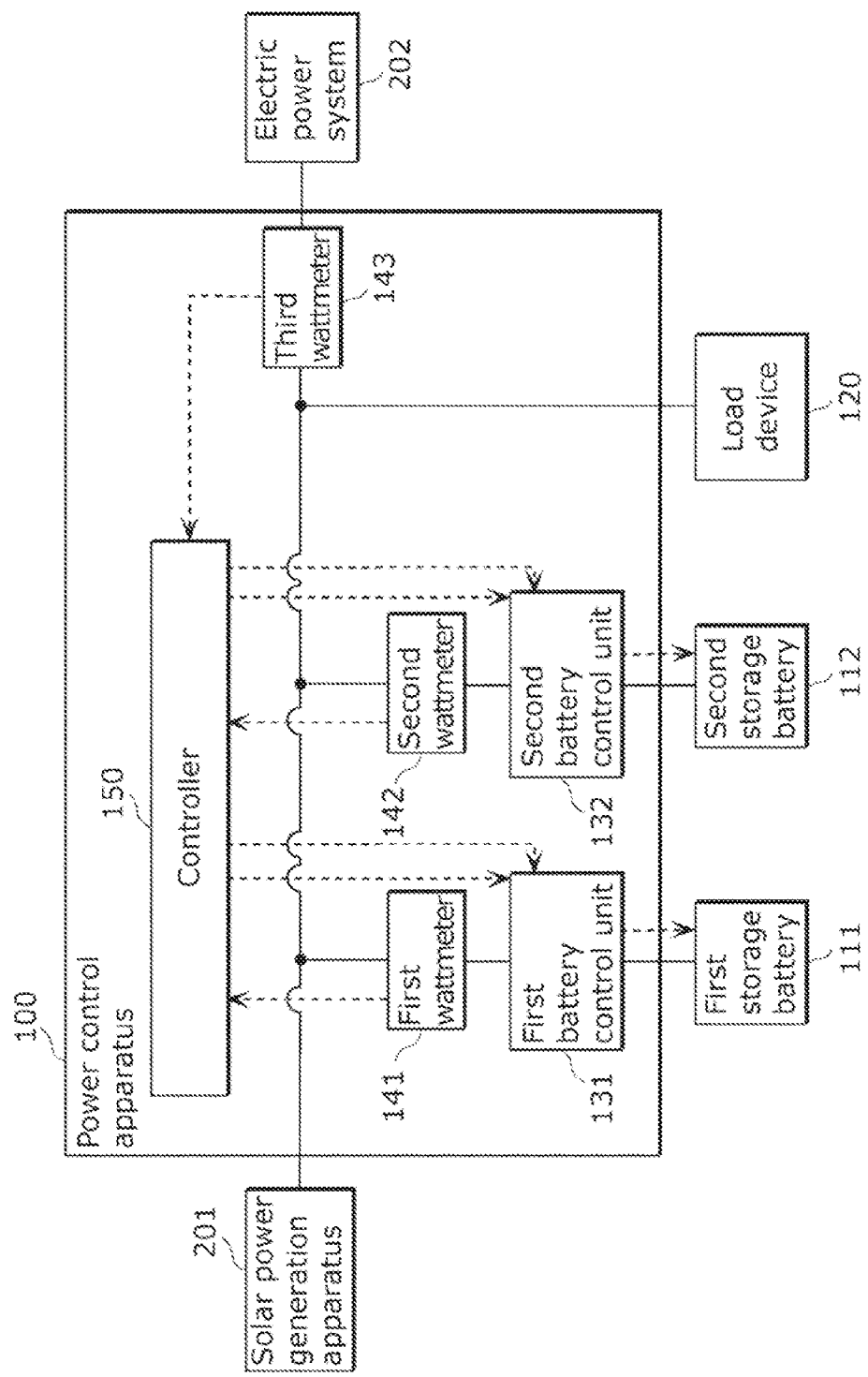
FIG. 10 is a block diagram showing a power control apparatus according to Embodiment 2.

FIG. 10 is a block diagram showing a power control apparatus according to Embodiment 2. The power control apparatus 100 shown in FIG. 10 includes a controller 150, a first battery control unit 131, a second battery control unit 132, a first wattmeter 141, a second wattmeter 142, and a third wattmeter 143. Also, the power control apparatus 100 is connected to a solar power generation apparatus 201, an electric power system 202, a first storage battery 111, a second storage battery 112, and a load device 120.

As in the case of Embodiment 1, the load device 120 is typically a household electrical appliance which consumes supplied electric power, but may be another device.

The electric power system 202 is a system for power supplied from an electric power company. The solar power generation apparatus 201 is an apparatus which generates electric power using solar energy. The first storage battery 111 is a chargeable and dischargeable battery as in the case of Embodiment 1. The first storage battery 111 is charged or discharged under the control of the power control apparatus 100. The first storage battery 111 typically accumulates electric power generated by a solar power generation apparatus 201. The second storage battery 112 is an apparatus similar to the first storage battery 111. The load device 120 is supplied with electric power from these power sources.

Also, the controller 150, first battery control unit 131, and second battery control unit 132 correspond to the control unit 101 according to Embodiment 1. That is, the controller 150, first battery control unit 131, and second battery control unit 132 perform processes similar to those of the control unit 101 according to Embodiment 1.

Also, the controller 150, first wattmeter 141, second wattmeter 142, and third wattmeter 143 correspond to the power acquisition unit 102 according to Embodiment 1. That is, the controller 150, first wattmeter 141, second wattmeter 142, and third wattmeter 143 perform processes similar to those of the power acquisition unit 102 according to Embodiment 1.

Thus, the controller 150 carries part of the functions of both the control unit 101 and power acquisition unit 102 according to Embodiment 1.

The first wattmeter 141 is an apparatus which measures the discharged power from the first storage battery 111 and the charging power to the first storage battery 111. The second wattmeter 142 is an apparatus which measures the discharged power from the second storage battery 112 and the charging power to the second storage battery 112.

The third wattmeter 143 is an apparatus which measures the electric power flowing in from the electric power system 202 and the electric power flowing out to the electric power system 202. The third wattmeter 143 indicates excess or deficiency of the delivered power of the solar power generation apparatus 201, first storage battery 111, and second storage battery 112 with respect to the load device 120.

For example, the third wattmeter 143 measures an amount of electric power flowing in from the electric power system 202 as a positive value and measures an amount of electric power flowing out to the electric power system 202 as a negative value. When the delivered power of the solar power generation apparatus 201, first storage battery 111, and second storage battery 112 is more than the electric power consumed by the load device 120, the third wattmeter 143 registers a negative value. On the other hand, when the delivered power of the solar power generation apparatus 201, first storage battery 111, and second storage battery 112 is less than the electric power consumed by the load device 120, the third wattmeter 143 registers a positive value.

Also, when the third wattmeter 143 registers a negative value, it is assumed that the delivered power is excessive. On the other hand, when the third wattmeter 143 registers a positive value, it is assumed that the delivered power is deficient.

The controller 150 acquires the discharged power of the first storage battery 111 from the first wattmeter 141, acquires the discharged power of the second storage battery 112 from the second wattmeter 142, and acquires the excess or deficiency of the delivered power from the third wattmeter 143. Then, based on the acquired information, the controller 150 acquires the total power to be supplied from the first storage battery 111 and second storage battery 112 to the load device 120.

More specifically, when the delivered power is deficient, the controller 150 acquires electric power equal to the sum of the discharged power of the first storage battery 111 and discharged power of the second storage battery 112 plus the shortfall, as the total power to be supplied. When the delivered power is excessive, the controller 150 acquires electric power equal to the sum of the discharged power of the first storage battery 111 and discharged power of the second storage battery 112 minus the surplus, as the total power to be supplied.

The first battery control unit 131 controls the discharged power of the first storage battery 111. Furthermore, the first battery control unit 131 may control the charging power of the first storage battery 111. Also, the second battery control unit 132 controls the discharged power of the second storage battery 112. Furthermore, the second battery control unit 132 may control the charging power of the second storage battery 112.

By controlling operation of the first battery control unit 131 and second battery control unit 132, the controller 150 controls the discharged power of the first storage battery 111 and discharged power of the second storage battery 112. Then, in normal operation, the controller 150 controls the two discharged powers such that the sum of the two discharged powers should be equal to the total power to be supplied to the load device 120. In other words, the controller 150 controls the two discharged powers such that a measured value of the third wattmeter 143 should be 0.

Figure 11:
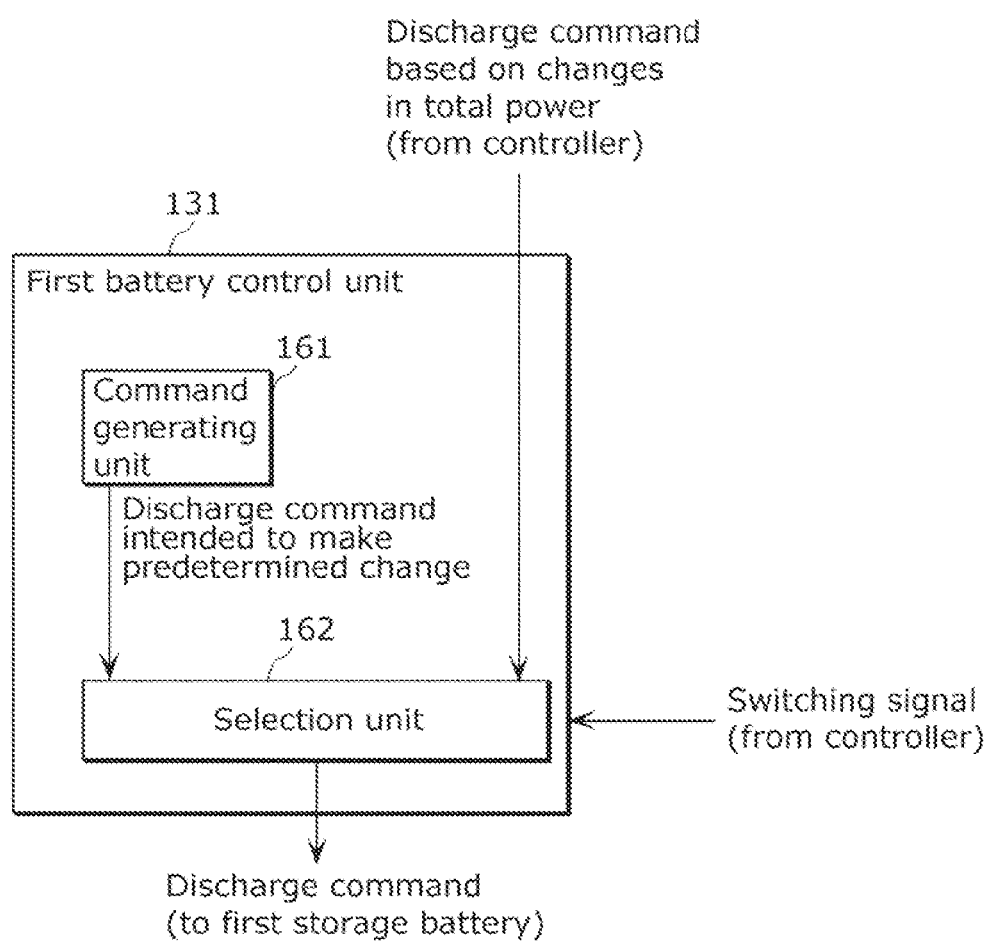
FIG. 11 is a block diagram showing a battery control unit according to Embodiment 2.

FIG. 11 is a block diagram showing the first battery control unit 131 of the power control apparatus 100 shown in FIG. 10. The first battery control unit 131 shown in FIG. 11 includes a command generating unit 161 and a selection unit 162.

The command generating unit 161 generates a discharge command to make a predetermined change. More specifically, the command generating unit 161 generates a discharge command to change the discharged power of the first storage battery 111 in a manner determined in advance. For example, the command generating unit 161 generates a discharge command to increase or decrease the discharged power of the first storage battery 111 at a predetermined rate.

Based on a switching signal from the controller 150, the selection unit 162 selects one of a discharge command from the controller 150 and a discharge command from the command generating unit 161. The discharge command from the controller 150 is based on changes in total power and intended to change the first storage battery 111 by following the changes in the total power. The selection unit 162 sends the selected discharge command to the first storage battery 111.

For example, the controller 150 sends a start command, which is intended to cause the first storage battery 111 to start operating as a master, to the first battery control unit 131 as a switching signal. The master here is the storage battery whose discharged power changes with changes in the total power. In this case, of the two discharge commands, the selection unit 162 selects the discharge command which is based on changes in the total power.

Also, for example, the controller 150 sends a prepare command, which is intended to prepare the first storage battery 111 to operate as a master, to the first battery control unit 131 as a switching signal. In this case, of the two discharge commands, the selection unit 162 selects the discharge command which is intended to make a predetermined change. More specifically, the selection unit 162 selects the discharge command generated by the command generating unit 161 and intended to increase the discharged power of the first storage battery 111 at a predetermined rate.

Also, for example, the controller 150 sends a prepare-to-finish command, which is intended to prepare the first storage battery 111 to finish operating as a master, to the first battery control unit 131 as a switching signal. In this case, of the two discharge commands, the selection unit 162 selects the discharge command which is intended to make a predetermined change. More specifically, the selection unit 162 selects the discharge command generated by the command generating unit 161 and intended to decrease the discharged, power of the first storage battery 111 at a predetermined rate.

The first storage battery 111 receives the discharge command from the first battery control unit 131 and outputs electric power according to the discharge command. Now, when the first storage battery 111 receives the discharge command which is based on changes in the total power, the discharged power of the first storage battery 111 changes by following the changes in the total power. On the other hand, when the first storage battery 111 receives the discharge command which is intended to make a predetermined change, the discharged power of the first storage battery 111 increases or decreases at a predetermined rate or otherwise changes in a manner determined in advance.

Note that the second battery control unit 132 includes components similar to those of the first battery control unit 131, i.e., a command generating unit 161 and a selection unit 162. These components operate in a manner similar to the components of the first battery control unit 131. The second battery control unit 132 sends one of the discharge command which is based on changes in the total power and discharge command which is intended to make a predetermined change, to the second storage battery 112, and thereby controls the discharged power of the second storage battery 112.

Figure 12:
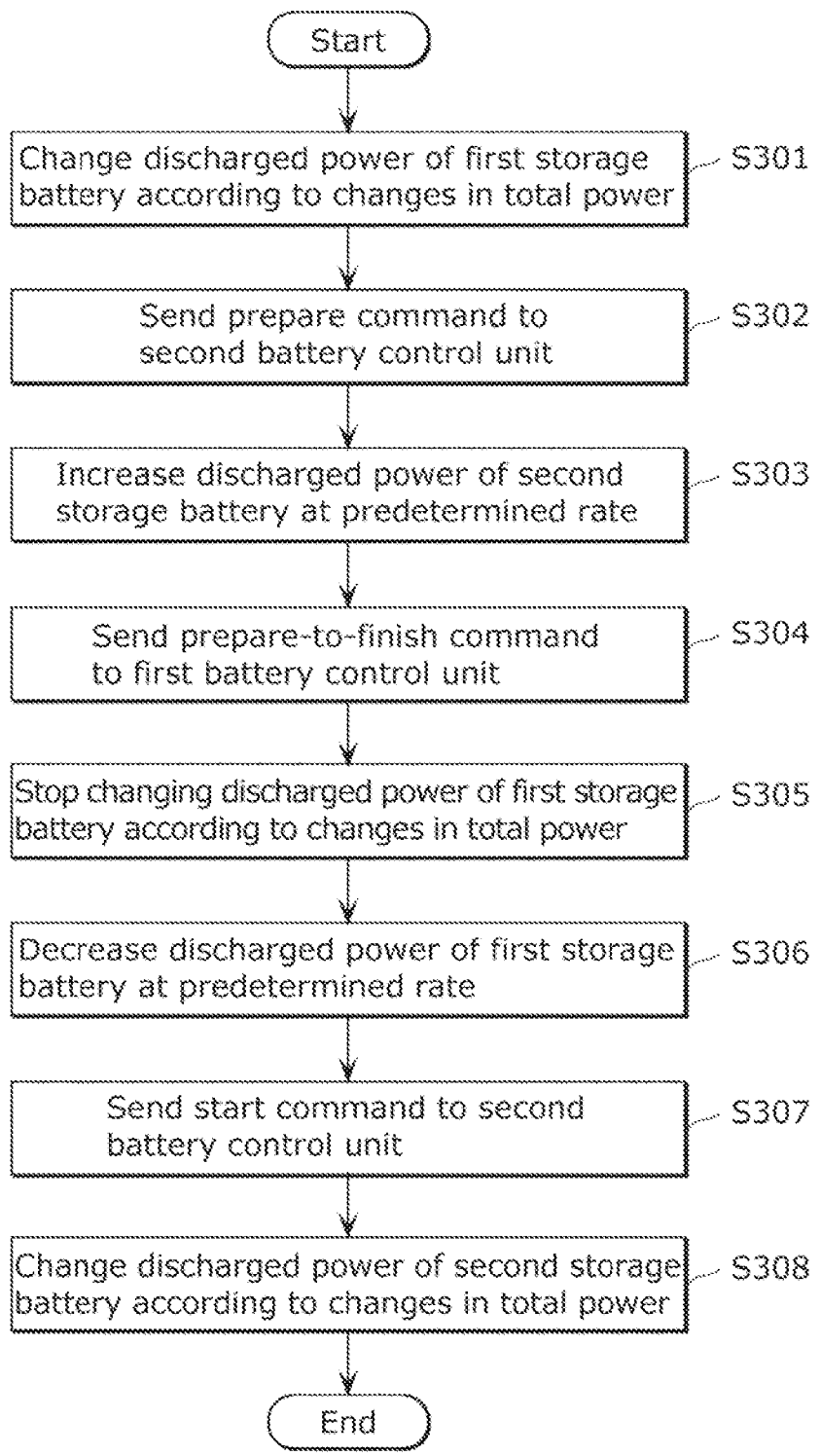
FIG. 12 is a flowchart showing a power control process according to Embodiment 2.

FIG. 12 is a flowchart showing a power control process of the power control apparatus 100 shown in FIG. 10.

First, the power control apparatus 100 changes the discharged power of the first storage battery 111 according to changes in the total power (S301).

Specifically, the controller 150 acquires the total power to be supplied from the first storage battery 111 and second storage battery 112 to the load device 120. Then, the controller 150 sends a discharge command which is based on changes in the total power to the first battery control unit 131. The selection unit 162 of the first battery control unit 131 selects the discharge command which is based on changes in the total power and sends the selected discharge command to the first storage battery 111. Consequently, the discharged power of the first storage battery 111 changes according to changes in the total power.

Next, the controller 150 sends a prepare command to the second battery control unit 132 (S302). The prepare command here is a command intended to prepare the second storage battery 112 to operate as a master.

Next, the second battery control unit 132 receives the prepare command from the controller 150. Then, the selection unit 162 of the second battery control unit 132 selects the discharge command generated by the command generating unit 161 and intended to increase the discharged power of the second storage battery 112 at a predetermined rate. Then, the selection unit 162 sends the selected discharge command to the second storage battery 112. Consequently, the discharged power of the second storage battery 112 increases at a predetermined rate (S303).

Next, the controller 150 sends a prepare-to-finish command to the first battery control unit 131 (S304). The prepare-to-finish command here is a command intended to prepare the first storage battery 111 to finish operating as a master.

Next, the first battery control unit 131 receives the prepare-to-finish command from the controller 150. Then, the selection unit 162 of the first battery control unit 131 selects the discharge command generated by the command generating unit 161 and intended to decrease the discharged power of the first storage battery 111 at a predetermined rate. Then, the selection unit 162 sends the selected discharge command to the first storage battery 111.

Consequently, the first battery control unit 131 stops changing the discharged power of the first storage battery 111 according to changes in the total power (S305). Then, the first battery control unit 131 decreases the discharged power of the first storage battery 111 at a predetermined rate (S306).

Next, the controller 150 sends a start command to the second battery control unit 132 (S307). The start command here is a command intended to cause the second storage battery 112 to start operating as a master.

Next, the second battery control unit 132 receives the start command from the controller 150. Then, the selection unit 162 of the second battery control unit 132 selects the discharge command which is based on changes in the total power and sends the selected discharge command to the second storage battery 112. Consequently, the second battery control unit 132 changes the discharged power of the second storage battery 112 according to changes in the total power (S308).

The discharged power of the first storage battery 111 and discharged power of the second storage battery 112 are controlled according to the procedures described above. Also, by sending a prepare command, prepare-to-finish command, and start command in sequence, the controller 150 switches control in an appropriate sequence.

Figure 13:
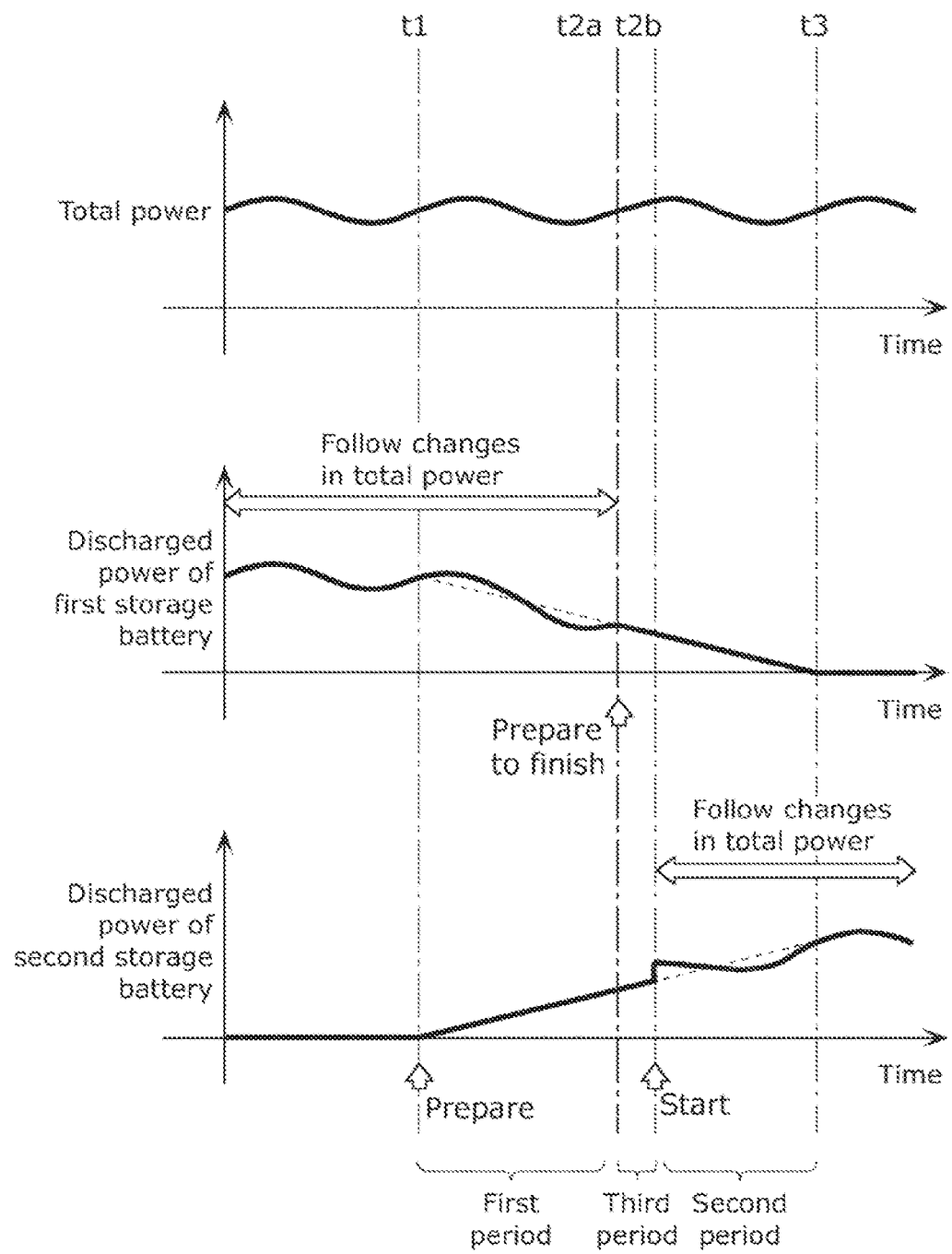
FIG. 13 is a diagram showing a first example of power control according to Embodiment 2.

FIG. 13 is a diagram showing a first example of power control by the power control apparatus 100 shown in FIG. 10. FIG. 1.3 shows a typical example of a switching process according to Embodiment 2.

First, the second battery control unit 132 controls the discharged power of the second storage battery 112 so as to be 0 until time t1. That is, the second battery control unit 132 keeps the second storage battery 112 from discharging. Also, the first battery control unit 131 changes the discharged power of the first storage battery 111 according to changes in the total power. Until time t1, the discharged power of the first storage battery 111 is equal to the total power.

Next, at time t1, the controller 150 sends a prepare command to the second battery control unit 132. The prepare command here is a command intended to prepare the second storage battery 112 to operate as a master. The second battery control unit 132 receives the prepare command from the controller 150 and increases the discharged power of the second storage battery 112 at a predetermined rate. The discharged power of the first storage battery 111 tends to decrease with increases in the discharged power of the second storage battery 112.

Next, at time t2a, the controller 150 sends a prepare-to-finish command to the first battery control unit 131. The prepare-to-finish command here is a command intended to prepare the first storage battery 111 to finish operating as a master. The first battery control unit 131 receives the prepare-to-finish command from the controller 150 and decreases the discharged power of the first storage battery 111 at a predetermined rate.

At time t2b, the controller 150 sends a start command to the second battery control unit 132. The start command here is a command intended to cause the second storage battery 112 to start operating as a master. The second battery control unit 132 receives the start command from the controller 150 and changes the discharged power of the second storage battery 112 by following changes in the total power.

Then, at time t3, the discharged power of the first storage battery 111 becomes 0. Subsequently, the discharged power of the second storage battery 112 becomes equal to the total power.

As described above, in the example of FIG. 13, there is a third period between the first period in which the discharged power of the first storage battery 111 follows the total power and the second period in which the discharged power of the second storage battery 112 follows the total power. In the third period, the discharged power of the first storage battery 111 decreases at a predetermined rate and the discharged power of the second storage battery 112 increases at a predetermined rate.

Figure 14:
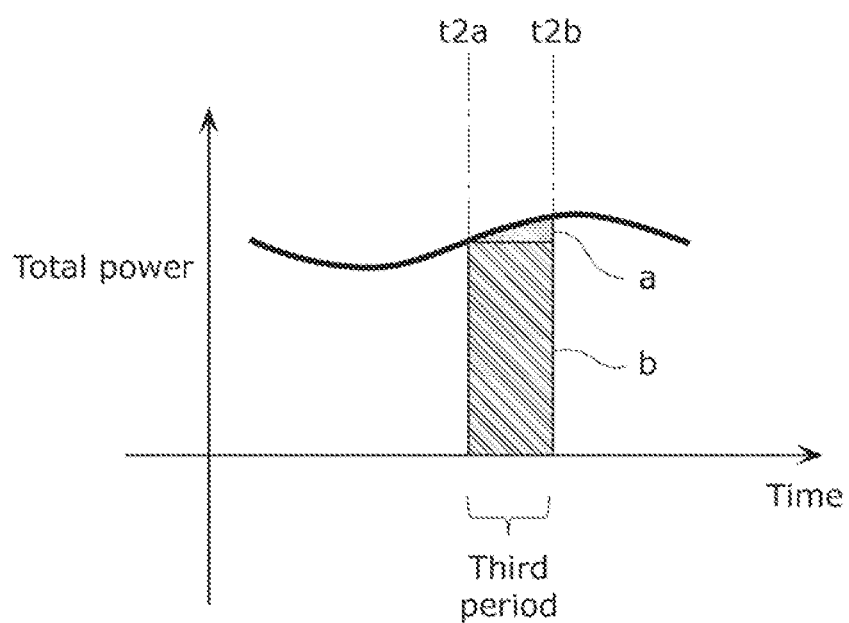
FIG. 14 is a chart showing a relationship between required power and delivered power according to Embodiment 2.

FIG. 14 is a diagram showing a relationship between required power and delivered power in relation to power control shown in FIG. 13. In the period (third period) from time t2a to time t2b, the total power to be supplied from the first storage battery 111 and second storage battery 112 to the load device 120 is electric power which corresponds to the sum of an area a and area b in FIG. 14. On the other hand, electric power actually supplied from the first storage battery 111 and second storage battery 112 to the load device 120 is electric power which corresponds to the area b in FIG. 14.

That is, the electric power which corresponds to the area a flows in from the electric power system 202 as a result of a power shortage. In this way, electric power may flow in depending on a time difference between stop of following and start of following. However, by increasing the discharged power of the second storage battery 112 in advance and by not stopping the discharged power of the first storage battery 111 instantaneously, the power control apparatus 100 limits a range of power inflow from the electric power system 202, to the area a.

In the example of FIG. 13, in the period from time t2a to time t2b, since the total power is on the increase, electric power flows in from the electric power system 202. In the period from time t2a to time t2b, when the total power is on the decrease, electric power will flow out to the electric power system 202. However, based on principles similar to principles of inflow, the power control apparatus 100 can limit power outflow, keeping an outflow rate within an allowable range.

Also, as in the case of Embodiment 1, the power control related to the switching process is not limited to the example of FIG. 13, and various modifications are conceivable.

Figure 15:
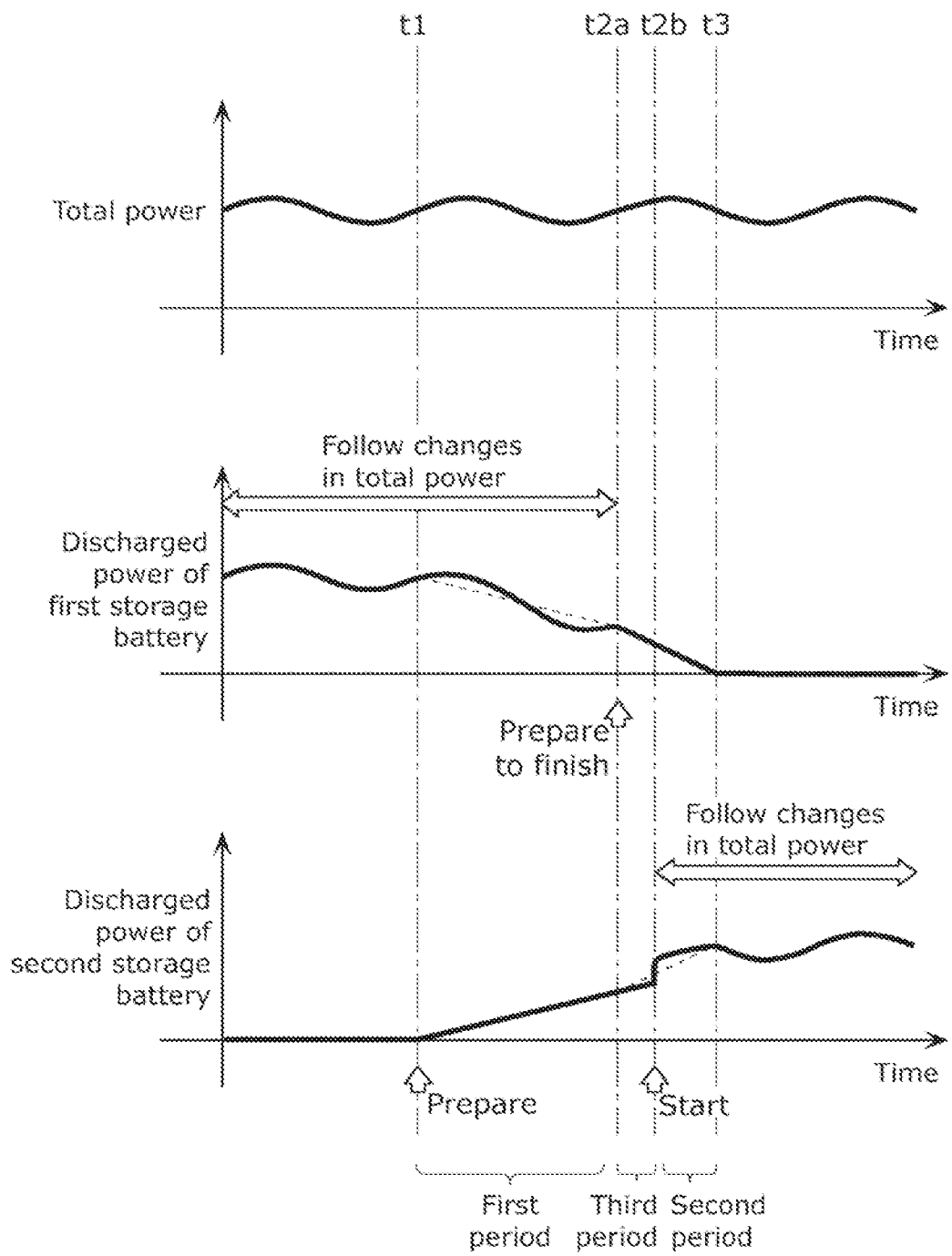
FIG. 15 is a diagram showing a second example of power control according to Embodiment 2.

FIG. 15 is a diagram showing a second example of power control by the power control apparatus 100 shown in FIG. 10. Compared to the example of FIG. 13, in the example of FIG. 15, the discharged power of the second storage battery 112 from time t1 to time t2b and the discharged power of the first storage battery 111 from time t2a to time t3 differ in the rate of change. In this way, even when there is a difference in the rate of change, similar effects can be obtained.

Figure 16:
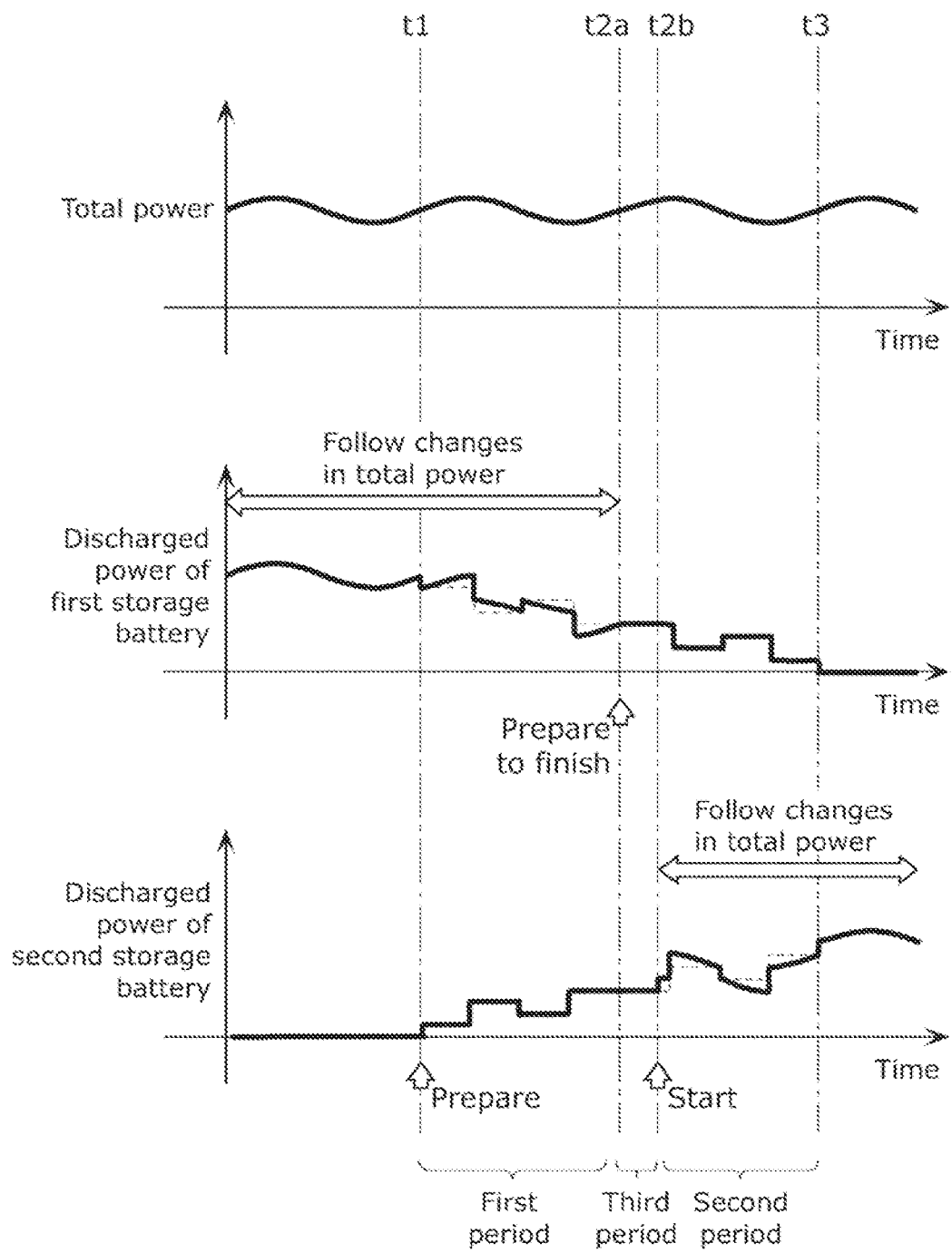
FIG. 16 is a diagram showing a third example of power control according to Embodiment 2.

FIG. 16 is a diagram showing a third example of power control by the power control apparatus 100 shown in FIG. 10. As shown in the example of FIG. 16, from time t1 to time t2b, the discharged power of the second storage battery 112 may be increased stepwise or decreased temporarily. Also, from time t2a to time t3, the discharged power of the first storage battery 111 may be decreased stepwise or increased temporarily.

Similar effects can be obtained as long as the discharged power of the second storage battery 112 is on the increase between time t1 and time t2b and the first storage battery 111 is on the decrease between time t2a and time t3.

Figure 17:
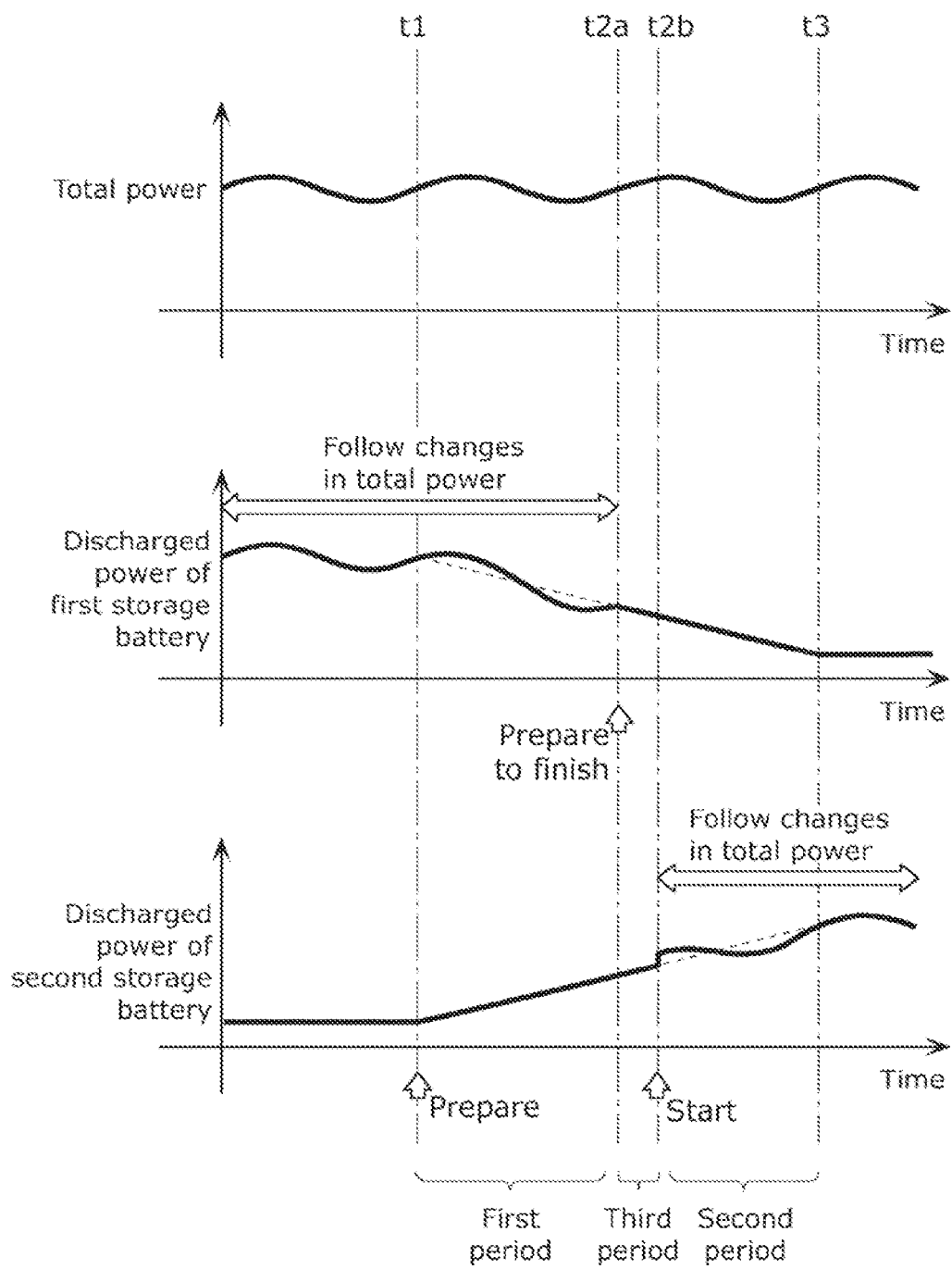
FIG. 17 is a diagram showing a fourth example of power control according to Embodiment 2.

FIG. 17 is a diagram showing a fourth example of power control by the power control apparatus 100 shown in FIG. 10. In the example of FIG. 17, the discharged power of the second storage battery 112 is not 0 and predetermined power is output until time t1. Then, from time t1 to time t2b, the discharged power of the second storage battery 112 increases from the predetermined power at a predetermined rate.

Also, from time t2a to time t3, the discharged power of the first storage battery 111 decreases to predetermined power at a predetermined rate. Then, from time t3, the discharged power of the first storage battery 111 is not 0, and predetermined power is output.

In this way, even when power is constantly output from both the first storage battery 111 and second storage battery 112, a similar switching process is applicable and similar effects can also be obtained even in such a case.

Figure 18:
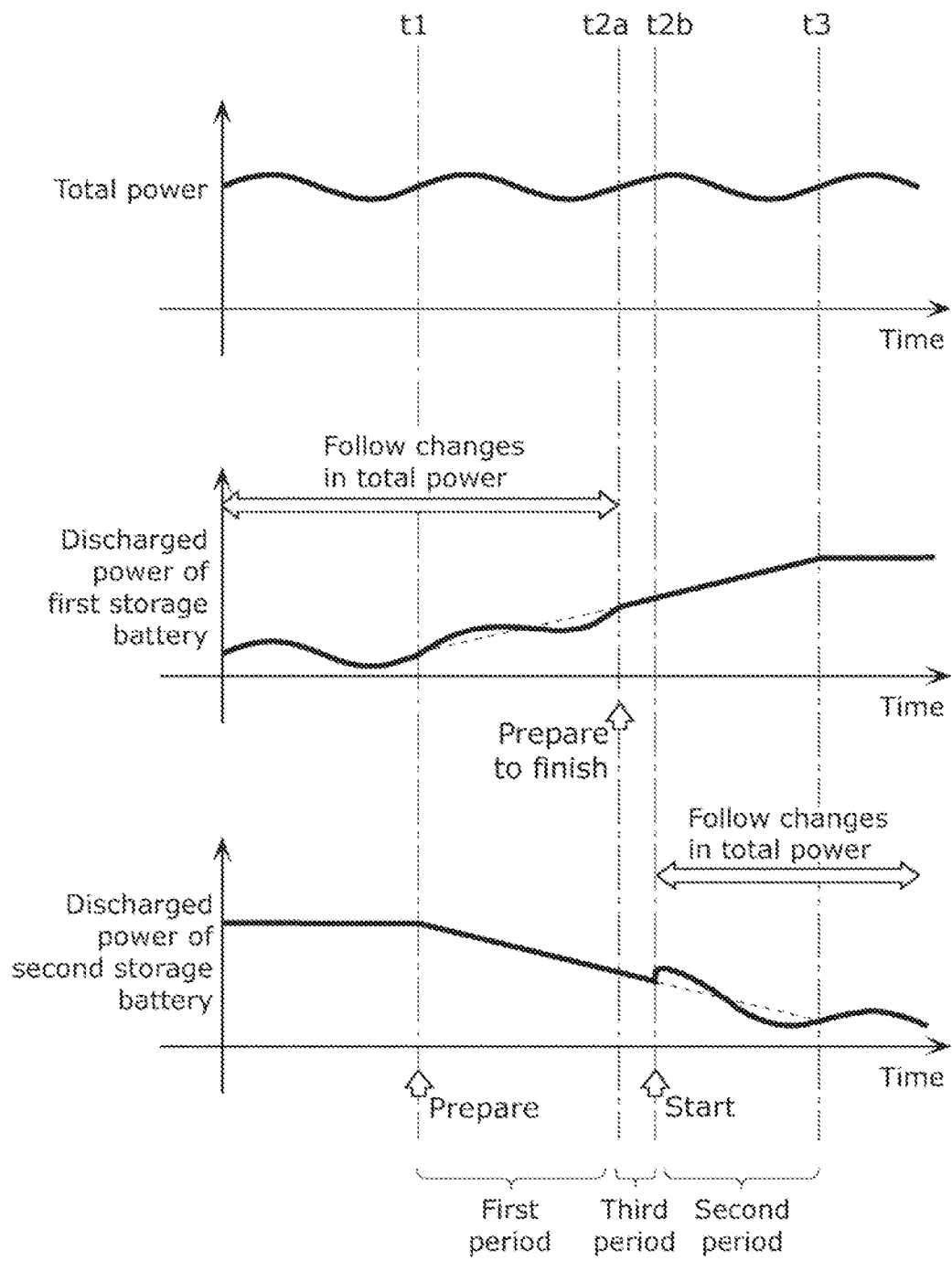
FIG. 18 is a diagram showing a fifth example of power control according to Embodiment 2.

FIG. 18 is a diagram showing a fifth example of power control by the power control apparatus 100 shown in FIG. 10. In the example of FIG. 18, as with the example of FIG. 17, the discharged power of the second storage battery 112 is not 0 and predetermined power is output until time t1. Furthermore, at this time, the discharged power of the second storage battery 112 is higher than the discharged power of the first storage battery 111. In such a case, from time t1 to time t2b, the discharged power of the second storage battery 112 decreases from the predetermined power at a predetermined rate.

Also, from time t2a to time t3, the discharged power of the first storage battery 111 increases to predetermined power at a predetermined rate. Then, from time t3, the discharged power of the first storage battery 111 is not 0, and the predetermined power is output.

In this way, even when the discharged power of the storage battery which follows changes in the total power is lower than the discharged power of the other storage battery, a similar switching process is applicable, and similar effects can also be obtained even in such a case.

Figure 19:
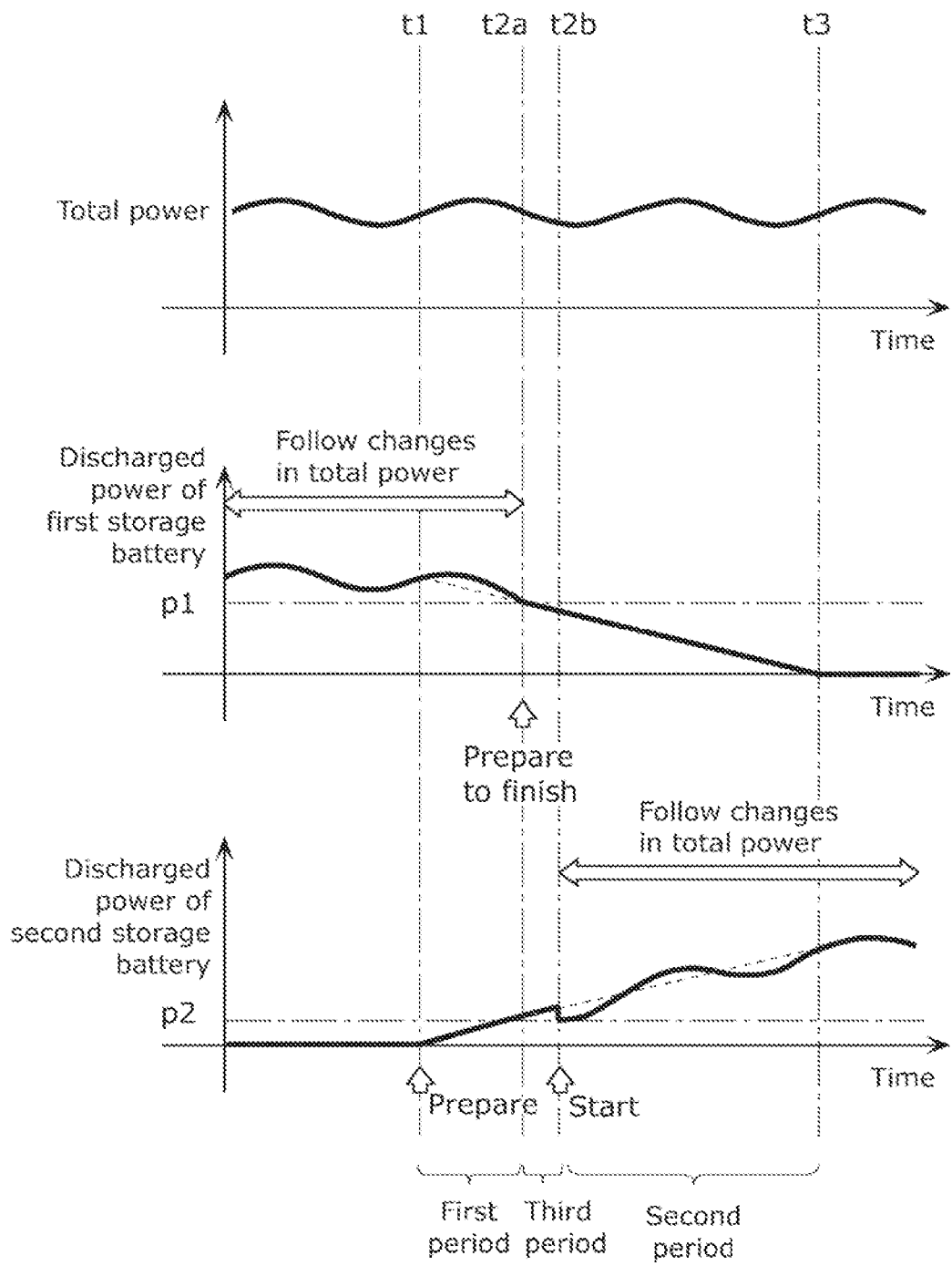
FIG. 19 is a diagram showing a sixth example of power control according to Embodiment 2.

FIG. 19 is a diagram showing a sixth example of power control by the power control apparatus 100 shown in FIG. 10. In the example of FIG. 19, when the discharged power of the first storage battery 111 and discharged power of the second storage battery 112 become approximately equal, the storage battery which is to follow changes in the total power is switched.

More specifically, first the controller 150 changes the discharged power of the first storage battery 111 according to changes in the total power. On the other hand, the controller 150 increases the discharged power of the second storage battery 112. Then, the controller 150 compares the discharged power of the first storage battery 111 and discharged power of the second storage battery 112. Then, when the discharged power of the first storage battery 111 and discharged power of the second storage battery 112 become approximately equal, the controller 150 switches the storage battery which is to follow changes in the total power.

For example, in FIG. 19, when the absolute value of a difference between discharged power p1 of the first storage battery 111 and discharged power p2 of the second storage battery 112 falls to or below a predetermined threshold, the controller 150 sends a prepare-to-finish command to the first battery control unit 131. Furthermore, after a lapse of a predetermined time, the controller 150 sends a start command to the second battery control unit 132. Consequently, the storage battery which is to follow changes in the total power can be switched with more appropriate timing.

Figure 20:
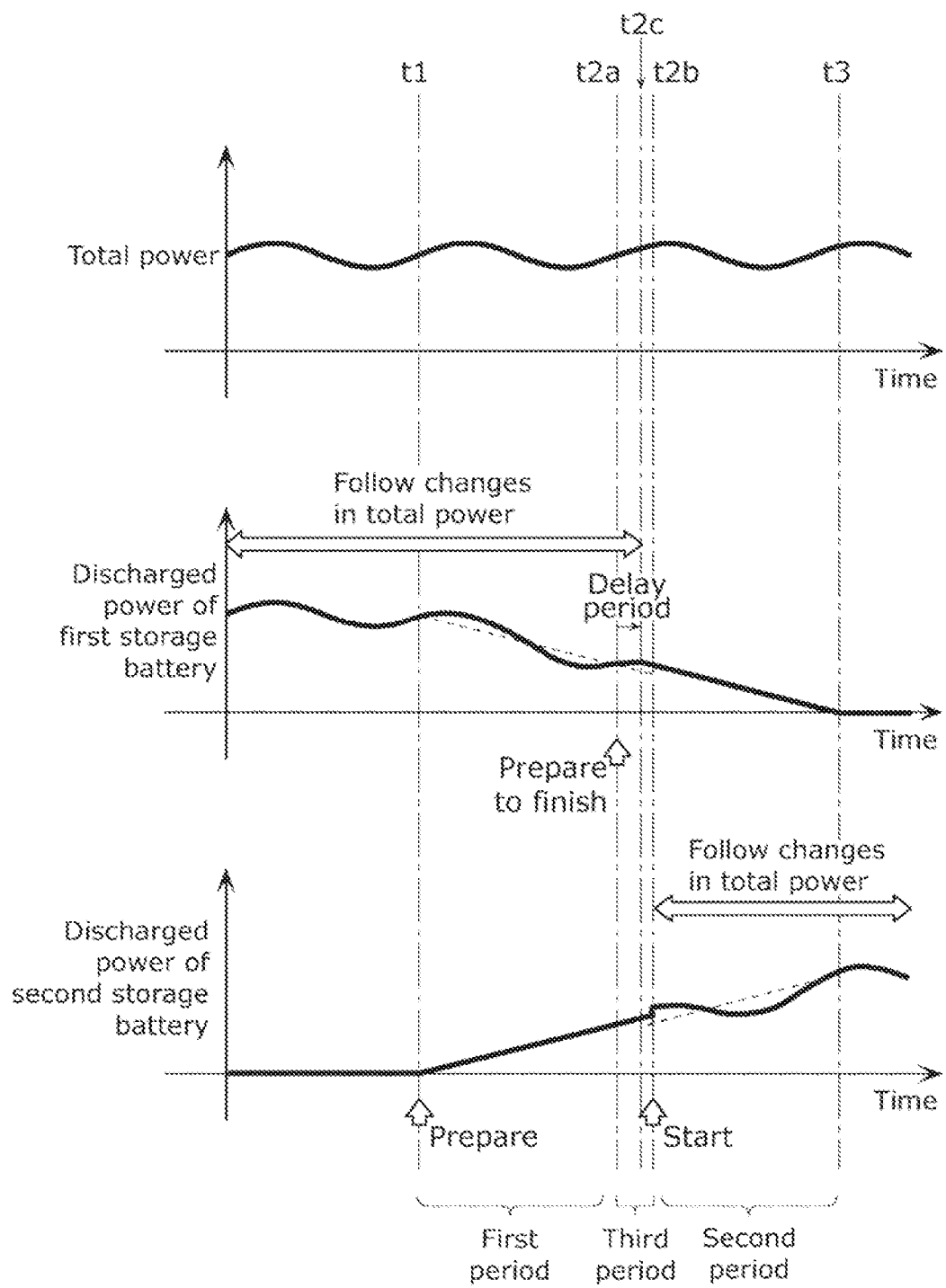
FIG. 20 is a diagram showing a modification of power control according to Embodiment 2.
Figure 21:
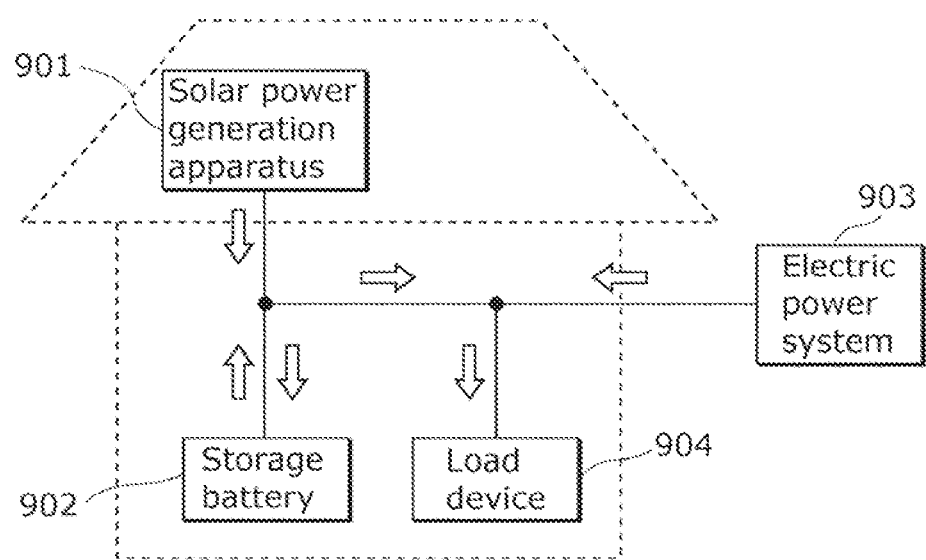
FIG. 21 is a conceptual diagram showing a so power generation system according to a conventional technique.
Figure 22:
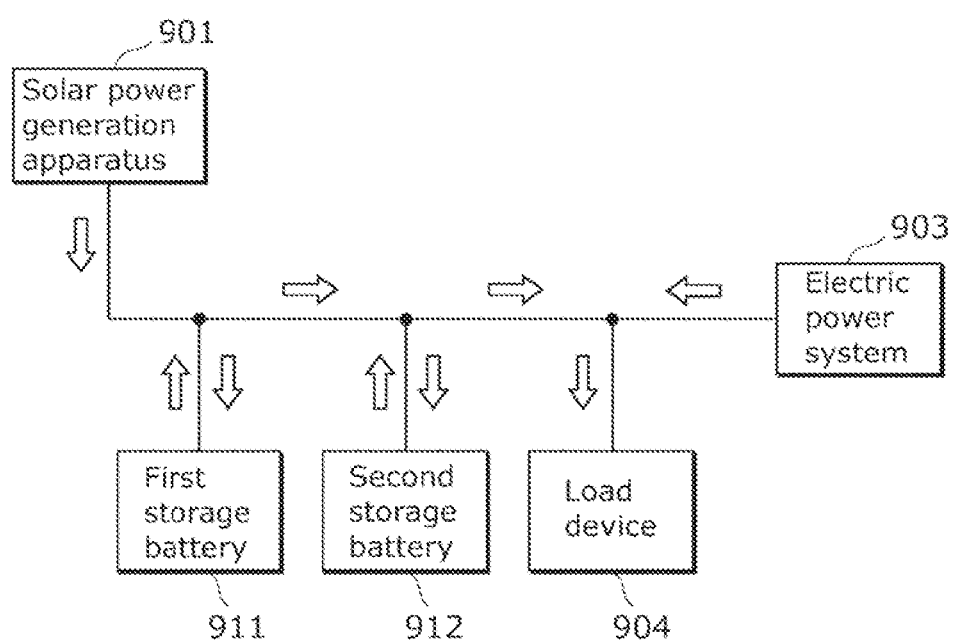
FIG. 22 is a conceptual diagram showing a solar power generation system using plural storage batteries.

FIG. 20 is a diagram showing a modification of power control by the power control apparatus 100 shown in FIG. 10. The first battery control unit 131 continues changing the discharged power of the first storage battery 111 by following changes in the total power until a predetermined period (delay period) elapses after receiving a prepare-to-finish command from the controller 150. Then, after a lapse of the predetermined period, the first battery control unit 131 stops changing the discharged power of the first storage battery 111 according to changes in the total power. Subsequently, the first battery control unit 131 decreases the discharged power of the first storage battery 111 to predetermined power at a predetermined rate.

That is, the first battery control unit 131 starts a predetermined change at time t2c after a lapse of the predetermined period from time t2a at which the prepare-to-finish command is received. Consequently, time t2c at which the discharged power of the first storage battery 111 starts a predetermined change gets close to time t2b at which the discharged power of the second storage battery 112 starts changing by following the changes in the total power. Thus, the power control apparatus 100 can limit power inflow from, or power outflow to the electric power system 202.

Note that time t2c at which the predetermined change is started may be the same as time t2b at which the follow-up change is started. Also time t2c at which the predetermined change is started may be slightly later than time t2b at which the follow-up change is started.

FIG. 20 also shows an example in which a delay period is set in the power control shown in FIG. 13. However, a similar delay period may be set in any of multiple instances of power control shown in FIGS. 15 to 19. This allows the power control apparatus 100 to limit inflow from, or outflow to, the electric power system 202.

Also, in the examples shown in FIGS. 13, 16, 17, 18, 19, and 20, the sum of the discharged power of the first storage battery 111 and discharged power of the second storage battery 112 is constant from the stop time of following (time t2a or time t2c) to the start time of following (time t2b).

In this way, the controller 150 may control the discharged power of the first storage battery 111 and discharged power of the second storage battery 112 such that the sum should be constant. It is assumed that changes in the total power to be supplied are relatively small. Thus, by keeping the discharged power constant, the controller 150 can limit power inflow or outflow.

For example, in the example shown in FIG. 13, from the stop time of following (time t2a) to the start time of following (time t2b), the discharged power of the first storage battery 111 and discharged power of the second storage battery 112 differ in the direction of change, but coincide in the rate of change. This allows the power control apparatus 100 to keep the sum constant without using a complex process.

Alternatively, from the stop time of following to the start time of following, the controller 150 may control the two discharged powers such that the sum of the two discharged powers decreases gradually. This reduces the risk that the sum of the two discharged powers exceeds the total power. Thus, power outflow is limited. For example, as with the example shown in FIG. 15, by making the discharged power of the first storage battery 111 decrease faster than the discharged power of the second storage battery 112 increases, the controller 150 can decrease the sum of the two discharged powers gradually.

In this way, when switching the storage battery to be discharged according to required power, from the first storage battery 111 to the second storage battery 112, the power control apparatus 100 according to Embodiment 2 brings the discharged power of the second storage battery 112 close to the discharged power of the first storage battery 111. Consequently, even when there is a period in which following stops, the sum of the discharged power of the first storage battery 111 and discharged power of the second storage battery 112 is kept close to the total power to be supplied. This limits power outflow to, or power inflow from, the electric power system 202.

Also, the controller 150 sends a prepare command, prepare-to-finish command, and start command to the first battery control unit 131 and second battery control unit 132. This allows the power control apparatus 100 to appropriately switch between changing the discharged power of the first storage battery 111 and changing the discharged power of the second storage battery 112.

Whereas the power control apparatus according to the present invention has been described above based on plural embodiments, the present invention is not limited to the above embodiments. Modifications to the above embodiments may occur to those skilled in the art, and forms obtained by making such modifications as well as any other forms implemented by arbitrarily combining components of the embodiments are also included in the present invention.

For example, a process performed by a specific processing unit may be performed by another processing unit. Also, the order in which processes are performed may be changed or plural processes may be performed concurrently.

Also, the plural embodiments described above show switching processes which involve two storage batteries. However, the switching process described in each of the embodiments is also applicable to a switching process which involves three or more storage batteries. For example, the power control apparatus can switch between major storage batteries by performing the switching process described above with respect to any two of three or more storage batteries.

Furthermore, the present invention can be implemented, not only as a power control apparatus, but also as a method including, as steps, the processing units included in the power control apparatus. For example, such steps are executed by a computer. Moreover, the present invention can be implemented as a program for causing a computer to execute the steps included in the method. In addition, the present invention can be implemented as a non-transitory computer-readable recording medium, such as a CD-ROM, on which such program is recorded.

Furthermore, the components included in the power control apparatus may be implemented as a Large Scale Integration (LSI) which is an integrated circuit. These components may be individually configured as single chips or may be configured so that a part or all of the components are included in a single chip. Although an LSI is mentioned here, the integrated circuit can also be called an Integrated Circuit (IC), a system LSI, a super LSI, and an ultra LSI, depending on differences in integration.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to in the circuit integration of the components included in the power control apparatus.

INDUSTRIAL APPLICABILITY

The power control apparatus and the power control method according to the present invention are capable of effectively utilizing power stored in plural storage batteries, and can be used in a solar power generation system.

REFERENCE SIGNS LIST

100 Power control apparatus
101 Control unit
102 Power acquisition unit
111, 911 First storage battery
112, 912 Second storage battery
120, 904 Load device
131 First battery control unit
132 Second battery control unit
141 First wattmeter
142 Second wattmeter
143 Third wattmeter
150 Controller
161 Command generating unit
162 Selection unit
201, 901 Solar power generation apparatus
202, 903 Electric power system
902 Storage battery

The invention claimed is:

1. A power control apparatus of a solar power generation system, comprising:
   a control unit configured to control a discharged power of a first storage battery and a discharged power of a second storage battery; and
   a power acquisition unit configured to acquire a total power to be supplied from the first storage battery and the second storage battery to a load device connected to the first storage battery and the second storage battery,
   wherein the control unit is configured to:
      in a first period, change the discharged power of the first storage battery according to a change in the total power acquired by the power acquisition unit, change the discharged power of the second storage battery toward a first direction which is a direction in which the discharged power of the second storage battery comes close to the discharged power of the first storage battery, and thereby keep a sum of the discharged power of the first storage battery and the discharged power of the second storage battery equal to the total power acquired by the power acquisition unit; and
      in a second period after the first period, change the discharged power of the second storage battery according to the change in the total power acquired by the power acquisition unit, change the discharged power of the first storage battery toward a second direction which is a direction opposite the first direction, and thereby keep a sum of the discharged power of the first storage battery and the discharged power of the second storage battery equal to the total power acquired by the power acquisition unit.

2. The power control apparatus according to claim 1,
   wherein the control unit is configured to:
   in the first period, change the discharged power of the second storage battery toward the first direction by increasing the discharged power of the second storage battery from 0; and
   in the second period, change the discharged power of the first storage battery toward the second direction by decreasing the discharged power of the first storage battery to 0.

3. The power control apparatus according to claim 1,
   wherein the control unit is configured to:
   in the first period, change the discharged power of the second storage battery toward the first direction by increasing the discharged power of the second storage battery at a first rate; and
   in the second period, change the discharged power of the first storage battery toward the second direction by decreasing the discharged power of the first storage battery at a second rate.

4. The power control apparatus according to claim 1,
   wherein the control unit is configured to stop changing the discharged power of the first storage battery according to the change in the total power, in a third period between the first period and the second period.

5. The power control apparatus according to claim 4,
   wherein the control unit is configured to, in the third period, stop changing the discharged power of the first storage battery according to the change in the total power, and change the discharged power of the first storage battery toward the second direction.

6. The power control apparatus according to claim 4,
   wherein the control unit is configured to, in the third period, change the discharged power of the second storage battery toward the first direction.

7. The power control apparatus according to claim 4,
   wherein the control unit is configured to stop changing the discharged power of the first storage battery according to the change in the total power, after an elapse of a predetermined period from a start of the third period.

8. The power control apparatus according to claim 4,
   wherein the control unit is configured to control the discharged power of the first storage battery and the discharged power of the second storage battery and thereby keep a sum of the discharged power of the first storage battery and the discharged power of the second storage battery constant from when the control unit stops changing the discharged power of the first storage battery according to the change in the total power to when the second period starts.

9. The power control apparatus according to claim 1,
   wherein the power acquisition unit is configured to acquire the total power from the discharged power of the first storage battery, the discharged power of the second storage battery, and an excess or deficiency of power supply to the load device in relation to electric power consumed by the load device.

10. A power control method for a solar power generation system, comprising:
    controlling a discharged power of a first storage battery and a discharged power of a second storage battery; and
    acquiring a total power to be supplied from the first storage battery and the second storage battery to a load device connected to the first storage battery and the second storage battery,
    wherein in the controlling:
       in a first period, the discharged power of the first storage battery is changed according to a change in the total power acquired in the acquiring, the discharged power of the second storage battery is changed toward a first direction which is a direction in which the discharged power of the second storage battery comes close to the discharged power of the first storage battery, and a sum of the discharged power of the first storage battery and the discharged power of the second storage battery is thereby kept equal to the total power acquired in said acquiring; and in a second period after the first period, the discharged power of the second storage battery is changed according to the change in the total power acquired in the acquiring, the discharged power of the first storage battery is changed toward a second direction which is a direction opposite the first direction, and a sum of the discharged power of the first storage battery and the discharged power of the second storage battery is thereby kept equal to the total power acquired in said acquiring.

11. A non-transitory computer-readable recording medium for use in a computer, the recording medium having a computer program recorded thereon for causing the computer to execute the power control method according to claim 10.

12. An integrated circuit of a solar power generation system, comprising:

a control unit configured to control a discharged power of a first storage battery and a discharged power of a second storage battery; and a power acquisition unit configured to acquire a total power to be supplied from the first storage battery and the second storage battery to a load device connected to the first storage battery and the second storage battery, wherein the control unit is configured to:

in a first period, change the discharged power of the first storage battery according to a change in the total power acquired by the power acquisition unit, change the discharged power of the second storage battery toward a first direction which is a direction in which the discharged power of the second storage battery comes close to the discharged power of the first storage battery, and thereby keep a sum of the discharged power of the first storage battery and the discharged power of the second storage battery equal to the total power acquired by the power acquisition unit; and in a second period after the first period, change the discharged power of the second storage battery according to the change in the total power acquired by the power acquisition unit, change the discharged power of the first storage battery toward a second direction which is a direction opposite the first direction, and thereby keep a sum of the discharged power of the first storage battery and the discharged power of the second storage battery equal to the total power acquired by the power acquisition unit.

* * * * *